(12) United States Patent
Krebs et al.

(10) Patent No.: US 11,998,999 B2
(45) Date of Patent: Jun. 4, 2024

(54) SOLDERING OR SINTERING SYSTEM WITH PLURALITY OF MODULES AND TEMPERATURE CONTROL

(71) Applicant: PINK GMBH THERMOSYSTEME, Wertheim (DE)

(72) Inventors: Thomas Krebs, Wertheim (DE); Christoph Oetzel, Freudenberg-Boxtal (DE)

(73) Assignee: PINK GMBH THERMOSYSTEME, Wertheim (DE)

( * ) Notice: Subject to any disclaimer, the term of this patent is extended or adjusted under 35 U.S.C. 154(b) by 0 days.

(21) Appl. No.: 17/924,921

(22) PCT Filed: May 14, 2021

(86) PCT No.: PCT/EP2021/062871
§ 371 (c)(1),
(2) Date: Nov. 11, 2022

(87) PCT Pub. No.: WO2021/229073
PCT Pub. Date: Nov. 18, 2021

(65) Prior Publication Data
US 2023/0191518 A1    Jun. 22, 2023

(30) Foreign Application Priority Data

May 15, 2020   (DE) .......................... 102020113320.0
Jul. 23, 2020   (DE) .......................... 102020119527.3

(51) Int. Cl.
*B23K 1/00*    (2006.01)
*B23K 3/08*    (2006.01)
(Continued)

(52) U.S. Cl.
CPC ............ *B23K 1/0016* (2013.01); *B23K 3/085* (2013.01); *B23K 35/383* (2013.01); *B23K 2101/36* (2018.08)

(58) Field of Classification Search
None
See application file for complete search history.

(56) References Cited

U.S. PATENT DOCUMENTS 4,932,864 A    6/1990  Miyabe
2011/0039219 A1    2/2011  Kressmann et al.

FOREIGN PATENT DOCUMENTS

DE    3843191 C1    3/1990
DE    4024181 C1 *  2/1992    ............ B23K 1/015
(Continued)

*Primary Examiner* — Devang R Patel
(74) *Attorney, Agent, or Firm* — DINSMORE & SHOHL LLP

(57) ABSTRACT

A system for connecting electronic assemblies, in particular a soldering and/or sintering system, has a transport device for conveying the assemblies through the system, with a plurality of gas-tightly separable modules for connecting the assemblies to one another. At least one module is a soldering and/or sintering module and one module is a cooling module. Between the soldering/sintering and the cooling module, a further module is a soft cooling module for cooling between a process temperature of the soldering or sintering module and an intermediate temperature, in particular below a solder solidification temperature. In a soldering or sintering module in a gas-tightly sealable process chamber, in particular in the soft cooling module, at least one heat source is contactable with the assemblies for heating the assemblies and at least one cold trap is arranged, having in operation a surface temperature which is lower than a heat source operating temperature.

27 Claims, 14 Drawing Sheets

(51) Int. Cl.
*B23K 35/38* (2006.01)
*B23K 101/36* (2006.01)

(56) References Cited

FOREIGN PATENT DOCUMENTS

| | | | | |
|---|---|---|---|---|
| DE | 19953654 A1 * | 5/2001 | ............. | B23K 1/008 |
| DE | 19953654 A1 | 5/2001 | | |
| DE | 102014106631 A1 * | 11/2014 | ........... | B23K 1/0016 |
| DE | 102014106631 A1 | 11/2014 | | |
| EP | 0427020 A2 | 5/1991 | | |

* cited by examiner

SOLDERING OR SINTERING SYSTEM WITH PLURALITY OF MODULES AND TEMPERATURE CONTROL

CROSS-REFERENCE TO RELATED APPLICATIONS

This application is the U.S. National Stage of PCT/EP2021/062871 filed on May 14, 2021, which claims priority to German Patent Application 102020113320.0 filed on May 15, 2020, and German Patent Application 102020119527.3 filed on Jul. 23, 2020, the entire content of both are incorporated herein by reference in their entirety.

FIELD OF THE INVENTION

The invention relates to a system for connecting electronic assemblies, in particular to a soldering or sintering system with a transport device for conveying the electronic assemblies through the system, comprising a plurality of gas-tightly separable modules for connecting the electronic assemblies to one another, wherein at least one module is designed as a soldering or sintering module and one module as a cooling module.

BACKGROUND OF THE INVENTION

Systems as stated at the outset for temperature treatment of components with gas-tightly sealable chambers or modules are known from the prior art.

A system of this type can for example be designed as a soldering device for making a soldered connection between several components, in particular electronic assemblies. This can be achieved by heating and melting solder material which is arranged between the components to be connected and/or coating a component with solder material for a subsequent connection process. In general, the components and the solder material, for example in the form of solder chips, as a solder paste or as solder powder, are temporarily joined together to form a stack before being introduced into the process chamber.

A soldering device of this type is in particular used in large-area connections, in which for example semiconductor components, microelectronic components or power semiconductor chips, such as for example transistors or diodes on printed circuit boards, IGBTs, MOSFETs or diodes on metallized ceramic substrates or other circuit carriers are soldered or soldered together, or in which metallized ceramic substrates are soldered to metallic base plates and/or heat sinks. Printed circuit boards intended to be connected to heat sinks can also be soldered in a generic soldering device.

In order to achieve an optimum soldering result, an effort is made to heat the molten solder together with the components to be connected in controlled manner to above the melting point of the solder, and then to perform cooling in controlled manner to below the solidification point of the solder in order to connect the components to one another without voids. The solder can be a soft or a hard solder, in particular a tin solder, but also a silver solder, brass solder or phosphorus solder.

Solder connections are generally produced in a process chamber which is sealed off from its surroundings, in particular is evacuatable, and in which for example a base plate and a pressure plate can be arranged, between which is received a solder group comprising the component(s) and the solder material. The base plate and the pressure plate can be adjustable relative to one another with regard to the distance for exerting a pressure force on the solder group. At the same time, the pressure plate and/or the base plate can heat and/or cool the components and the solder material. To this end, the stated plates can be thermally coupled to appropriate heat sources and/or heat sinks.

A system of this type can also be designed as a sintering device for making a workpiece from at least one component by means of pressure sintering, in particular by means of low-temperature pressure sintering. A sintering device of this type can comprise an upper tool and a lower tool, between which the at least one component is held, wherein the upper tool and the lower tool are adjustable relative to one another for applying a pressure to the workpiece to be sintered, and at least one heating device for heating the workpiece to be sintered.

In sintering devices of this type, a solid workpiece can be produced under the effect of heat and pressure from a so-called green body consisting of a fine-grained or coarse-grained material or a material mix. In addition to compressing and compacting of the sintered material, the contacted surfaces of the connection partners are connected mechanically, thermally and if applicable electrically. The use considered here serves in particular the mechanical and electrical and/or thermally conductive connection of two components, in particular electrical semiconductor components such as high-performance switching elements or semiconductor assemblies, and a basic body, as a rule a PCB, in particular a DCB (Direct Copper Bonded)/AMB (Active Metal Braze) leadframe on a metallic lead carrier or connection frame, a heat sink or the like.

Furthermore, it is possible in a variant of pressure sintering, low-temperature pressure sintering, for two or more components, in particular electronic components and substrates, to be connected to one another by means of a joining material, in particular in an electrically and/or thermally conductive manner, with the connecting joining material being sintered. A corresponding device and a method are known for example from DE 10 2008 009 510 B3.

Further systems can be designed as automatic sintering or soldering systems, in particular automatic multi-chamber systems having a plurality of process chambers. The latter comprise at least one chamber or one module for electrical and/or thermal connection of an electrical component to a further component group, to an electrical PCB or DCB/AMB leadframes or to a heat sink.

The term "components" can generally be taken to mean electronic assemblies, circuit carriers, substrates, substrate carriers, base plates, workpiece carriers, mounting carriers or the like made from metal, ceramic, plastic or other materials or any desired combinations of material together with components to be mounted thereon, such as power semi-conductor chips, (semiconductor) assemblies or the like.

Workpiece carriers which can hold several components or component groups at the same time are often used, so that handling can be simplified and the throughput rates increased.

Systems of this type can have at least one gas-tightly sealable process chamber in which the components are received during temperature treatment. In this process chamber, a specific process atmosphere can be provided that reduces or prevents unwelcome chemical reactions, in particular oxidation of metallic surfaces of the workpiece, and/or triggers, favors or catalyzes desirable chemical reactions. In the process atmosphere, the relative oxygen content for example can be reduced, for example to an oxygen content from 0.005% to 0.3%. To do so, an inert gas such as nitrogen ($N_2$) for example can be introduced into the process chamber. The process atmosphere can also comprise a forming gas containing reduction means, e.g. formic acid ($CH_2O_2$) or nitrogen and hydrogen (N/H).

The provision of the process atmosphere can also comprise influencing of the pressure conditions, i.e. generating a positive pressure or a negative pressure.

Systems of this type frequently comprise several process chambers in which the components can be subjected to differing process conditions or process atmospheres. It is for example possible to achieve temperature regulation of the components or assemblies to temperatures below the melting temperature of the solder material in a first process chamber, heating up to the soldering temperature in a second process chamber, and controlled cooling down in a third process chamber, where in each case the properties of the process atmosphere can vary from process chamber to process chamber, or can also be changed over time during the dwell time in a respective chamber.

Due to the sealed modules or process chambers, the components, or the workpiece carriers in which a number of components are simultaneously connected to one another, remain inside the modules in a so-called quiescent process, in contrast to a flow process which is possible with non-sealed modules or process chambers. To ensure flow production, several components in a flow production transport can be arranged in one workpiece carrier, i.e. clustered, passed through the system in a step-by-step stationary process, and then released again singly into a further flow production. This also makes it possible to incorporate a step-by-step stationary system into a continuous flow production process. Clustering and separation can be automated, allowing facilitated quality control and if required the addition of covers and the like, for example for a sintering process.

During heating of the solder material or joining material, its constituents, for example binders or fillers, can escape into the process atmosphere by sublimation or evaporation, which can lead to unwanted fouling or contamination of components, of the process chamber, of system components held therein or of secondary equipment such as pumps, valves or pipes. Other substances such as fluxes, adhesives to fix the components or constituents of the components to be connected, and reaction products of the said constituents and atmospheres, can also lead to impurities of this type.

With automatic multi-chamber systems or with a system consisting of multiple modules in modular design, these workpiece carriers can be transported between the various modules or chambers with the aid of transport devices also referred to as running rails. The individual chambers can each be separated from one another by vacuum insertable gate valves in order to provide individually settable process atmospheres. These vacuum insertable gate valves or airlocks are usually cooled to protect seals from heat damage.

For example, a device and a method for reflow soldering with a heat source for heating the solder material and with a negative pressure control device are known from EP 2 768 625 B1. In the negative pressure control device, the solder material is subjected at least twice to a negative pressure at a temperature corresponding at least to the liquidus temperature. Furthermore, methods or devices are indicated in which a negative pressure is generated at least before the beginning of the soldering operation.

DE 102 374 94 B4 shows a method for soldering in the vapor phase, where a negative pressure is generated around the soldered material before, during and/or after melting of the solder on the soldered material in the vapor phase zone.

The patent family of DE 102 374 94 B4 furthermore shows a device with two chambers, i.e. a first chamber for the vapor phase zone and a second chamber for the negative pressure, where the second chamber is either inside the first chamber or is movable into it.

DE 10 2007 005 345 B4 shows a method and a device for reflow soldering of assemblies, on which solder paste was applied, inside a chamber with heating inside the chamber. The assemblies are here conveyed into the chamber using a transport mechanism, then the chamber is sealed. Following that, the pressure in the chamber is increased relative to the atmospheric pressure and the temperature is increased by convection heating to melt the solder paste. The pressure is then returned to atmospheric pressure while maintaining the temperature.

With known systems and methods, there is generally the problem that impurities, in particular from the soldering additive and the atmosphere, remain on the assemblies or components and/or in at least one chamber after cooling down. These impurities lead to quality losses in the soldering operation and can for example cause cavities.

The object of the invention is therefore to propose a system using which deposits of unwanted substances inside the various modules and on the soldering points can be reduced or prevented.

The object of the invention is also to provide a system in which the formation of deposits of unwanted substances inside the modules and on the soldered material is reduced or prevented. It is the object of the invention to minimize a dwell time of unwanted condensate on the walls of the module, in particular in closed modules during stationary processes and under a controlled atmosphere influence.

This object is achieved by a system disclosed herein. Advantageous further developments of the invention are also disclosed.

SUMMARY OF THE INVENTION

The subject matter of the invention is a system for connecting electronic assemblies, in particular a soldering or sintering system with a transport device for conveying the electronic assemblies through the system, comprising a plurality of gas-tightly separable modules for connecting the electronic assemblies to one another, at least one module being designed as a soldering and/or sintering module and one module as a cooling module.

It is proposed that between the soldering or sintering module and the cooling module a further module is arranged that is designed as a soft cooling module for cooling between a process temperature of the soldering or sintering module and an intermediate temperature, in particular below a solder solidification temperature. The soft cooling module is therefore upstream of the cooling module, so that initially cooling down is possible to a required or achieved temperature which is in particular unequal to the room temperature. Preferably, the temperature up to which at least the solder material is cooled in the soft cooling chamber is slightly below the solder solidification temperature. Impurities due to the soldering operation, in particular solder paste residues, on the component or the assembly can be prevented as a result, since the impurities do not settle on the soldered material or condense on the electronic assemblies. In particular, condensation and deposits of the solder paste residues and/or from the atmosphere on the component or the assembly and inside the module itself can be at least reduced, and in particular prevented. This is achieved by, for example, the solder paste residues being deliberately brought to condensation in the area of the soft cooling module and preferably being deposited there. The impurities can therefore be directly removed from the soft cooling module before final cooling, and preferably do not reach the downstream cooling module. Adhesion to the component or the assemblies can be avoided, permitting an improvement in the quality of the soldered connection. Overall, a system, in particular a soldering system, can be provided with reduced fouling of the individual chambers of the soldering process, in particular when solder paste and/or HCOOH are used.

The terms chamber and module can be used synonymously in connection with the invention shown. In the soldering module, a temperature of for example 250° C. can prevail. In the cooling module, the electronic assemblies are cooled preferably to room temperature, i.e. 20° C. Thanks to the soft cooling module in between, a so-called first soft cooling can take place. This is preferably in a range just below the solder solidification temperature. The solder solidification temperature can be for example in the range from 150° C. to 220° C. The solder can in particular be a tin or silver solder (AG). In the soft cooling module, cooling down preferably takes place from above the liquidus temperature of for example 250° to below the solid temperature, i.e. the solder solidification temperature, i.e. a controlled cooling down from above through the melting range. A further module may be arranged in front of the soldering module, for example a preheating module and/or an airlock module for bringing the electronic assemblies into the system.

To keep the assembly and design expenditure as low as possible, it can be advantageous if the soft cooling module does not fall under the pressure equipment directive 2014/68/EU. Vessels, piping and pressure-maintaining equipment, and equipment having a safety function with an internal positive pressure of more than 0.5 bar, for example, is deemed to be pressure equipment in the meaning of directive 2014/68/EU. In the soft cooling module, a positive pressure of less than or equal to 0.5 bar can therefore preferably prevail. The volume of the chamber can be example approx. 50 liters or more, and other volumes are also conceivable. It is thus possible for example to dispense with an internal production check, reducing the time required. In particular, pressure flooding to 0.5 barg can take place, with this pressure then being maintained. The value 0.5 barg means a gauge pressure of 0.5 bar above the atmospheric pressure.

The temperature in the soft cooling module can be maintained or increased until the required positive pressure has built up in the soft cooling module. Heating in the soft cooling chamber can generally be achieved by convection, for example by gas, by contact heating and/or by radiation heating, in particular IR light.

Preferably, the system can comprise a higher-level control. This can be used to control all modules of the system. In a preferred embodiment, at least one module can have its own primary control circuit and/or safety circuit. This enables individual modules and/or individual work steps to be replaced without the need for complete reprogramming of the higher-level control. In particular, more than one module, in particular two or more modules, can have their own control circuit and/or safety circuit.

In a preferred embodiment, the soft cooling module can be configured to provide a positive pressure for a process atmosphere of 1 bar, in particular up to 4.5 bar or more. Preferably, the positive pressure can be increased in the soft cooling module from −1 bar (vacuum) from a chamber arranged in front to over 1 bar, in particular up to 3.5 bar. Other pressures are likewise conceivable. Overall, pressure ranges for which the already existing system is designed are sensible.

In a preferred embodiment, the soft cooling module can be configured to provide a negative pressure of below 1 bar, in particular a vacuum of −1 bar. As a result, a passage through the soldering system can take place in a vacuum, for example, which likewise leads to reduced fouling of the chambers during the soldering process, in particular with paste and/or formic acid HCOOH.

In a preferred embodiment, the soft cooling module can be designed as a positive pressure chamber and/or vacuum chamber. The soft cooling module can be separated using vacuum insertable gate valves from adjacent modules in order to provide the positive pressure chamber or vacuum chamber. These vacuum insertable gate valves or airlocks can be cooled to protect seals arranged thereon from heat damage.

In a preferred embodiment, the soft cooling module can comprise a heating and/or a cooling device, which is in particular designed as a heatable and/or coolable contact plate, for controlled temperature adjustment and cooling down of the electronic assemblies from 500° C. or below to a temperature below the solder solidification temperature, in particular to 150° C. or less. Temperature adjustment and cooling down of the electronic assemblies can also take place from another temperature, for example 250° C., to a temperature below the solder solidification temperature.

In a preferred embodiment, the contact plate can be designed as a heating plate, and a cooling device as a gas cooling device for cooling down the contact plate by means of a gas flow, preferably a nitrogen gas flow, in particular a helium gas flow, from a side of the heating plate facing away from the electronic assemblies. As a result, controlled cooling can be advantageously achieved. In particular, cooling of the heating plates using cold nitrogen gas can follow the buildup of the required pressure. The gas can for example flow from underneath to the at least one switched-off heating plate. In another embodiment, a required cooling down can be achieved over a selected distance between the heating plate and the electronic components. In all cases, there is preferably a cooling down of the solder to below the solidification point. Following that, the electronic assemblies can be conveyed out of the soft cooling module into the subsequent cooling module.

The at least one heating plate can in particular be made of aluminium and/or copper. Preferably, the heating plate is made of copper.

In a preferred embodiment, the contact plate is designed with a sandwich structure. Preferably, a cooling operation can take place using thermal oil. In particular, a heating operation can take place using a heating cable. A sandwich plate of this type can form a controllable, in particular heatable, contact plate and also be referred to as a soft cooling plate. The contact plate can comprise heating conductors inserted in meandering form, in particular in the form of at least one pipe profile. Furthermore, a thermocouple, in particular a substrate thermocouple, can be comprised, which is for example arranged in the center and/or flexibly designed. The contact plate can be controlled by a lifting unit system with pressure-controlled vacuum liquid feedthrough, in particular with motor control. In an exemplary embodiment, an oil thermostat, an expansion tank, at least one safety valve and/or a magnetically coupled thermal pump can also be comprised. A once-only filling with thermal oil can take place. Using the cooling plate, it is for example possible to achieve an oil temperature of less than or equal to 185° C. in the soft cooling module. This is achieved for example using a reinforced water-cooled heat exchanger as the oil cooler. The oil quantity can for example be recorded using a double sheath guide. In particular, the thermostat can operate self-sufficiently, and/or start signals and temperature requirements can be made using a programmable logic controller (PLC). In particular, a water temperature of 16° C. at 35 l/min is advantageous for practical reasons.

In a preferred embodiment, the contact plate can be mechanically movable, in particular can be brought into contact with and kept at a distance from the electronic assemblies and/or the contact plate can comprise a gas rack preferably designed in meandering form. The gas rack can for example be arranged as an N2 gas rack for soft cooling underneath the at least one heating plate.

In a preferred embodiment, a gas purging device for purging the electronic assemblies, in particular using cold gas, preferably with cold nitrogen gas, can be comprised in the soft cooling module. Thanks to the gas purging device, impurities from the soldering additive and/or atmosphere can be advantageously directly moved out of the soft cooling module and hence away from the electronic assemblies.

In a preferred embodiment, an inlet valve for admitting the gas into a process chamber of the soft cooling module can be comprised on the soft cooling module. This allows a required quantity of pure gas to be supplied directly to the soft cooling module. In particular, an outlet valve can also be arranged on the soft cooling module for extracting a required quantity of (impure) gas from the soft cooling module. As a result, the pressure inside the soft cooling module can be directly controlled. In particular, an extraction of impurities can take place at the soft cooling module by the deliberate removal of the gas. These impurities therefore advantageously do not pass into the downstream cooling module and are therefore removed early on from the soldering points before final cooling down of the electronic components or soldering points.

In a preferred embodiment, a gas collection container can be comprised outside a process chamber of the soft cooling module which is connected to the inlet valve and is designed to receive the gas extracted from the process chamber of the soft cooling module. The gas collection container can for example act as a buffer and supply tank for a cleaning and/or cooling gas, this not being limiting. A cleaning device for cleaning the gas extracted from the soft cooling module can be arranged inside, in front of or behind this gas collection container. Accordingly, the gas can be reused, allowing a sustainable process and a sustainable system to be provided.

In a preferred embodiment, a positive pressure valve for checking a positive pressure and/or a quick bleed valve can be comprised on the soft cooling module. The positive pressure relief valve can prevent a positive pressure of greater than or equal to 0.5 bar. This can ensure that in the soft cooling module a positive pressure only of less than 0.5 bar always prevails, wherein a design in accordance with the pressure equipment directive can be dispensed with.

In a preferred embodiment, a positive pressure of 4 to 6 bar can also prevail in the soft cooling module. The positive pressure can be adjusted to the soldering process.

In a preferred embodiment, cooling down from a temperature below the solder solidification temperature, in particular from a temperature below 150° C., to room temperature can take place in the cooling module. The cooling module can therefore enable final cooling down of the electronic components when in a cleaned state by the electronic assemblies passing through the soft cooling module.

In a preferred embodiment, a normal pressure or negative pressure, in particular a vacuum, can prevail in the cooling module. The cooling module can be separated from the soft cooling module by a vacuum insertable gate valve, to permit differing pressure states in two adjacent modules.

In a preferred embodiment, a further module upstream of the soldering or sintering module can be comprised that is designed as a preheating module. The preheating module is preferably arranged in front of the soldering module or in front of the sintering module.

In a preferred embodiment, a cold trap can be comprised in a process chamber, preferably in the process chamber of the soft cooling module, in particular as a gas cooler in the gas outlet path of the process chamber. The cold trap can have a finned structure to enlarge a cooling surface and to permit running off of condensate. Furthermore, the cold trap can have a drip tray configured to collect the condensate. The liquid condensate collected in the drip tray can be drained off via the drip tray to a collection container. The removal of the condensate can be reinforced by continuous drainage via a vacuum pump line. In an embodiment, the vacuum pump can in also be used for extraction of a cooling and cleaning gas. By deliberate evacuation of the vacuum chamber, remaining solvents can evaporate and condense at the cold trap and are thus deliberately collected. The cold trap can also act as a gas cooler to protect the downstream valves and the downstream pump system.

In particular, the cold trap can be designed as described in the following.

In a preferred embodiment, the separation of the gas-tightly separable modules or process chambers can be achieved using vacuum insertable gate valves, where a tightness of the vacuum insertable gate valves increases as the pressure increases and/or pressure equalization using the vacuum insertable gate valves can take place when the pressure is too high. The vacuum insertable gate valves can thus be designed as seals. These can close ever tighter as the positive pressure increases, so that opening under positive pressure is not possible. This can be achieved in particular in that a maximum force of a drive unit does not enable opening. Furthermore or alternatively, the vacuum insertable gate valves can be arranged such that gas can be bled off when the internal pressure or positive pressure is too high. This can for example take place in such a way that a valve plate is appropriately deformed to allow gas to flow out into the atmosphere. Advantageously, at the same time no ambient air can penetrate into the module, in particular into the soft cooling chamber. Advantageously, the at least one electronic assembly can as a result pass through the system without being damaged by oxygen.

In an advantageous embodiment, the vacuum insertable gate valves can be operated by a flow control. In particular, it can be achieved with the flow control that no air or oxygen can get into the modules, in particular into the soldering module and into the soft cooling module, at any time. This allows energy-consuming gas purging processes to be avoided. Due to the constant process atmosphere without oxygen, combustion or impurities caused by oxygen in residues from the soldering process can be avoided.

Advantageously, a method for soldering can proceed with the following steps: Evacuation of liquefied solder material inside the module, in particular inside the soldering module, transporting of the electronic assembly in a vacuum into the soft cooling module, wherein the at least one electronic assembly does not undergo any temperature loss during conveying.

The subject matter of the invention is furthermore a system for connecting electronic assemblies, in particular a soldering and/or sintering system, preferably a previously described system with a soft cooling module, with a transport device for conveying the electronic assemblies through the system, comprising a plurality of gas-tightly separable modules for connecting the electronic assemblies to one another, with at least one module being designed as a soldering and/or sintering module and one module as a cooling module. A module can preferably be designed as a drying module to dry sintering paste.

It is proposed that in a module designed in particular as a soldering or sintering module in a gas-tightly sealable process chamber, at least one heat source contactable with the electronic assemblies for heating the electronic assemblies and at least one cold trap are arranged, the latter having in operation a surface temperature which is lower than an operating temperature of the heat source.

This system can in particular comprise at least one soft cooling chamber, and the cold trap can advantageously be arranged in the soft cooling chamber. Alternatively, the one cold trap or a plurality of cold traps can be arranged in one or more modules, in particular in the soldering or sintering module, a preheating module and/or a cooling module.

Unwanted substances condense or resublimate at the cold trap, in particular constituents of solder pastes used as solder material and their reaction products, which evaporate or sublimate into the process atmosphere during joint heating of the assemblies and in particular of the solder material or originate from their reaction products which originate in the process.

This permits, in a soldering system in particular, the use of solder pastes without additional application of fluxes. The prevention of oxidation of the soldered material surfaces and the removal of already present oxide layers can be achieved by introducing reduction means into the process atmosphere. It is thus possible, by evacuation and flooding with $N_2$, to clean the process chamber of air and hence of $O_2$, so that the absence of oxygen can be achieved. A reduction means removes $O_2$ from the surface of the assemblies.

The cold trap can be bolted onto the cold chamber wall on the rear face, i.e. the interior of the process chamber. Other mounting methods and other mounting locations are also conceivable.

In a preferred embodiment, a specific process atmosphere can be provided in the process chamber, wherein the cold trap and the heat source are arranged relative to one another such that at least during a specific operating phase currents are present in the process atmosphere solely due to convection, which is generated by a temperature difference between the cold trap and the heat source. In a further embodiment, the jacket, i.e. the housing wall of the process chamber, can be cooled. For example, a thin infrared carbon heating foil of high capacity can be attached to the outer surface over one or more deep-drilled holes. This heats the jacket of the process chamber. For servicing work, the heater can be switched off and the chamber or the module cooled.

In a preferred embodiment, the surface temperature of the cold trap can be between −196° C. (77 k) and up to 150° C., in particular 16° C. to 25° C., and with a cascadable surface temperature of the cold trap preferably being providable. With a cascaded cold trap, a cascade can be provided with falling temperatures of the cold trap, in order for example to not concentrate the quantities of the condensate too strongly. The cascade can, with falling temperatures of the cold trap, have a first stage of the cascade with a lower temperature than a second stage, to favor convection of the process gas inside the process chamber.

In a preferred embodiment, at least one additional heat source for heating the process chamber can be provided. Advantageously, heating of the cold trap can be used to clean it of condensates in the process. To do so, the cold trap can be heated in suitable phases in the connection process in order to liquefy the condensates collected there or to improve their flow properties. The cold trap can then be cooled down again, so that this can be performed cyclically for the purposes of cleaning the cold trap. Heating up of the cold trap can be achieved for example by a reduction of the flow rate of the cooling water to 0 m/s.

In a preferred embodiment, the operating temperature of the heat source and/or of the additional heat source can be between 150° C. and 400° C., or preferably between 200° C. and 300° C. The operating temperature of the cold trap and the required influence of the heat source generally speaking depend on the process used and on the material used and possibly on the required effect.

In a preferred embodiment, at least one and in particular a plurality of electronic assemblies can be arranged on a workpiece carrier and preferably at a distance therefrom in the direction of the cold trap at least at times, so that in particular the distance of the assemblies to the cold trap is less than the distance of the workpiece carrier to the cold trap. Advantageously, a plurality of assemblies can be arranged on a workpiece carrier. The assemblies can here be spatially exposed on the workpiece carrier and at a distance in the direction of the cold trap, e.g. mounted elevated in the workpiece carrier or mounted to be adjustable in height. As a result, a reduced spatial distance of the assemblies to the cold trap can be achieved to improve a convection effect of impurities towards the cold trap. The cold trap can also have in the areas of the assemblies elevated portions on a surface facing the assemblies, in order to reduce the spatial distance to the assemblies. These elevated portions on the workpiece carrier and/or on the cold trap can be variable, e.g. changeable with spring loading or by means of an actuator, such that a distance reduction is selectively providable only during active operation of the cold trap.

In a preferred embodiment, at least one partial area of the process chamber, in particular at least one wall surface of the process chamber and/or a surface of a transport device arranged in the process chamber and provided to insert and/or remove assemblies, can be designed as a temperature adjustment zone, where said temperature adjustment zone has during operation a temperature between the surface temperature of the cold trap and the operating temperature of the heat source, wherein the temperature of the temperature adjustment zone is preferably between 50° C. and 150° C., in particular between 80° C. and 120° C. The temperature adjustment zone is preferably provided in the area of the outer sides of the process chamber.

In a preferred embodiment, the process chamber can be connected or connectable via a pipeline to an evacuation device, wherein an outlet of the pipeline into the process chamber is provided immediately adjacent to the cold trap. The condensed residues can be deliberately drained off via the pipeline.

In a preferred embodiment, the cold trap can have a plurality of cooling fins preferably extending in the vertical direction. This enlarges in particular the surface of the cold trap, thereby increasing efficiency. Furthermore, the cooling fins can be used at the same time for extracting the condensate from the cold trap. The cooling fins are therefore preferably vertically aligned, so that the condensate can be guided vertically downwards along the fins solely by gravity and hence by the shortest possible route.

In a preferred embodiment, a collection device can be provided underneath the cold trap to collect condensate generated at the cold trap. The collection device is preferably arranged over the complete width or length of the cooling fins, so that the condensate running over the cooling fins is reliably collected. The collection device can for example be designed as a deflector plate. In particular, the collection device is designed at an angle here, so that a gradient is created via which the condensate can be deliberately guided in one direction. At the end of the gradient, i.e. on one side of the collection device, an opening in particular, for example a slot or individual holes, can be arranged to guide the condensate out of the collection device.

In an advantageous embodiment, the heat source and/or the workpiece carrier with the assemblies can be adjustable in their distances relative to one another in the direction of the cold trap. This allows a spatial convergence of the assemblies or removal of the workpiece carrier during condensate extraction by the cold trap.

In an advantageous embodiment, the workpiece carrier can be separately heatable, so that condensate settling on it can be prevented, and the temperature gradient to the cold trap can be maintained or even increased. As a result, the removal of impurities can be deliberately controlled.

In an advantageous embodiment, a speed-controlled extraction vacuum pump with a liquid separator is provided for creating a negative pressure in the process chamber. The liquid separator allows the possibility of binding the condensate, in similar manner to a water pipe, and cleaning the extracted atmosphere of condensate. The outlet of the vacuum pump in the process chamber can here be advantageously arranged in the area of the cold trap to extract condensate collecting there.

In an advantageous embodiment, at least one vacuum insertable gate valve, in particular two heatable vacuum insertable gate valves at two opposite sides of the process chamber, can be provided for insertion and/or removal of the assemblies. Due to the possibility of heating the vacuum insertable gate valves, a deposit of condensate on the valves is avoided so that they do not form unwanted cold traps.

Advantageously, the housing wall of the process chamber and/or the vacuum gate valve can additionally be electrically heated, such that a definable temperature difference and convection to the cold trap is achievable, and the housing inner wall and inner surface of the vacuum airlock, i.e. of the gate valve, are not coated with condensate. To do so, a PTFE grid heating mat up to 250° C. or heating mats made of textile glass fabric are for example ideal, with heating temperatures up to 450° C. Infrared heating mats, for example made of rubber or carbon heating foils can also be used that can effortlessly achieve temperatures of for example 60° C., but can also be modified for a high radiation capacity and for higher temperature ranges. This allows the housing inner wall and/or the vacuum insertable gate valve to be at least partially coated.

BRIEF DESCRIPTION OF THE DRAWINGS

Further advantages are revealed by the appended drawings and the descriptions of the drawing. The drawing shows exemplary embodiments of the invention. The drawing and, description contain numerous features in combination. A person skilled in the art will expediently also consider the features individually and combine them into meaningful further combinations.

In the Figures.

DETAILED DESCRIPTION OF THE INVENTION

Identical or similar components are given the same reference signs in the figures.

Figure 1:
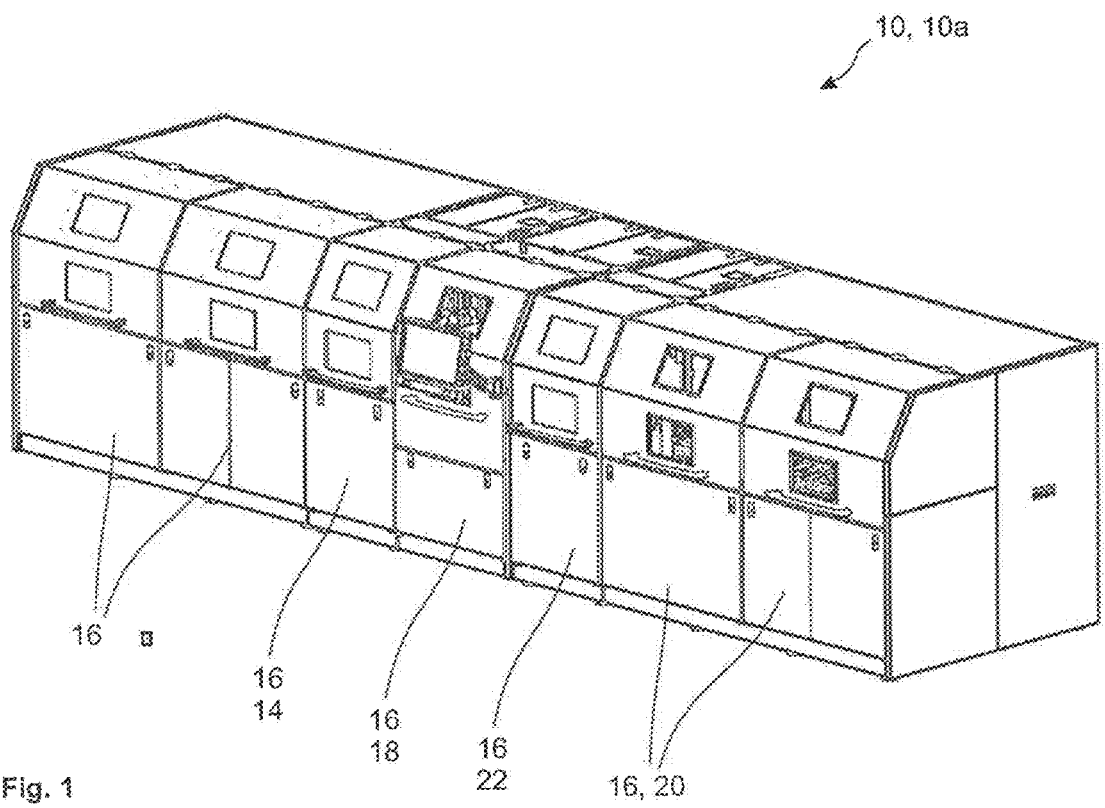
FIG. 1 is an embodiment of a system in accordance with the invention in an isometric view.

FIG. 1 shows an embodiment of a system 10 in accordance with the invention in an isometric view. The system 10 can be designed as a soldering system 10a and comprise a plurality of modules 16. In this embodiment, the system 10 comprises at least five modules 16, wherein the first and the last module 16 can each be subdivided again. The middle three modules 16 form a preheating module 14, a soldering or sintering module 18 and a soft cooling module 22. The soft cooling module is arranged between the soldering or sintering module 18 and the cooling module 20. The cooling module 20 forms the last module 16 of the system 10 in the embodiment shown. Furthermore, an unloading module can be downstream of the cooling module 20 in an embodiment not shown. The module 16 on the left in the representation can accordingly be designed as a loading module.

Figure 2:
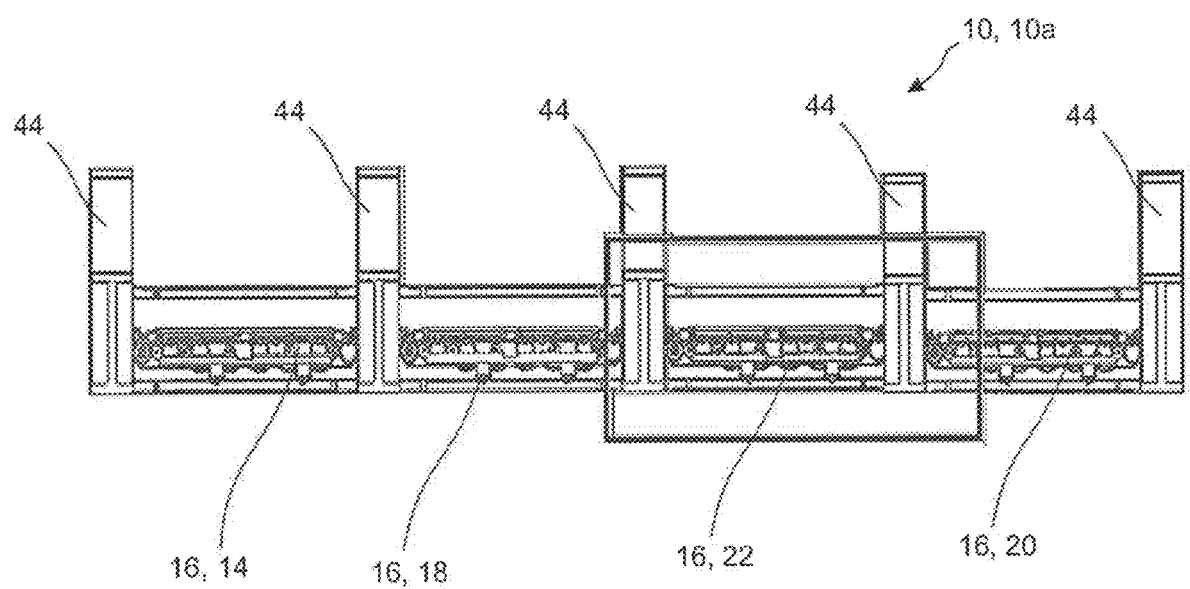
FIG. 2 a sectional representation of a further embodiment of a system in accordance with the invention.

FIG. 2 shows a sectional representation of a further embodiment of a system 10 in accordance with the invention. The vacuum insertable gate valves 44 between the individual modules 16 are discernible here. The housing is, unlike in the embodiment of FIG. 1, not shown. This embodiment shows four modules 16, a preheating module 14, a soldering or sintering module 18, a soft cooling module 22 and a cooling module 20. The modules 16 are arranged one behind the other in the sequence described. The soft cooling module 16 is spatially separated from the soldering or sintering module 18 and from the cooling module 20 by a vacuum insertable gate valve 44 in each case. A heating plate can be arranged in the soft cooling module 16, wherein the heating plate can be cooled from underneath with cold gas, in particular nitrogen. This permits cooling of the electronic assemblies to just below the solder solidification temperature.

Figure 3:
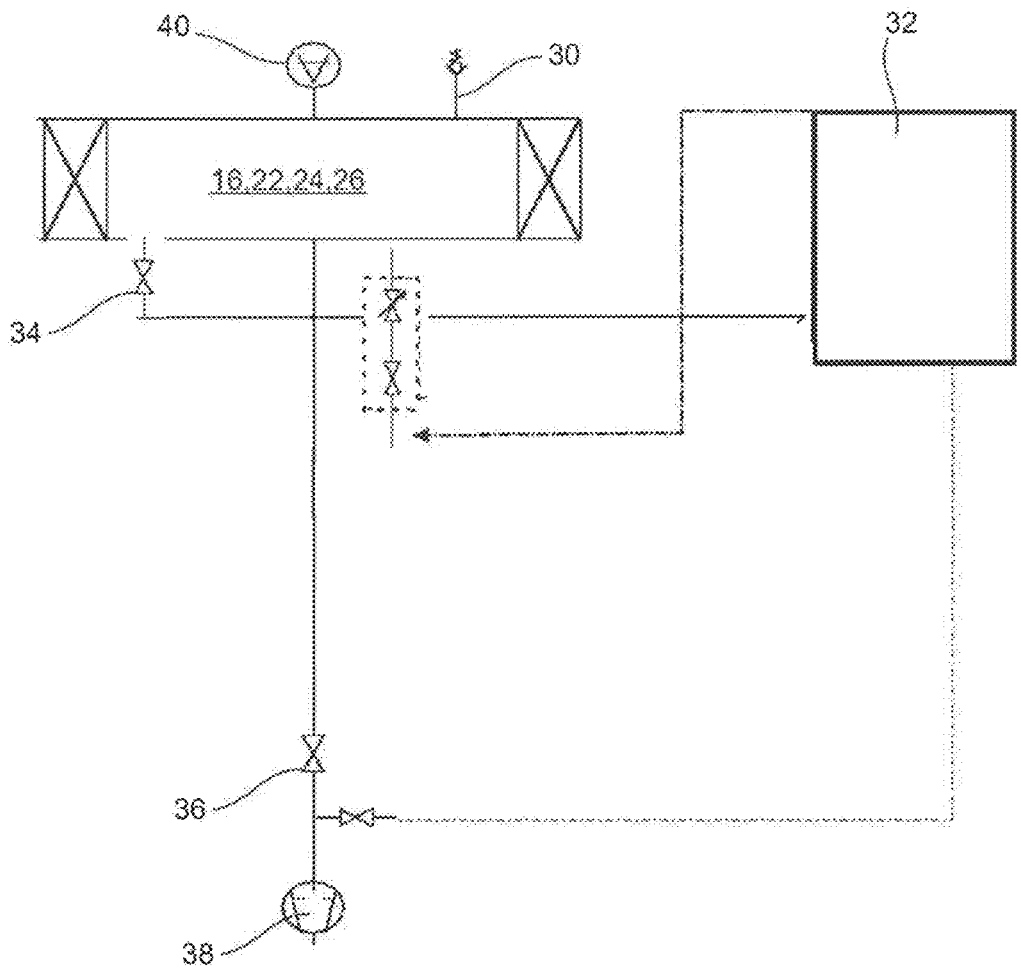
FIG. 3 a circuit diagram of an embodiment of a system in accordance with the invention.

FIG. 3 shows a circuit diagram of an embodiment of a system 10 in accordance with the invention. The soft cooling module 22 can be designed as a positive pressure chamber 24 or as a vacuum chamber 26. A positive pressure valve 30 is arranged on the soft cooling module 22. Furthermore, the soft cooling module 22 is connected to a backing pump 38 via an evacuation valve 36. For purging the electronic assemblies, a gas collection container 32 connected via an inlet valve 28 to the soft cooling module 22 is provided in this embodiment. The gas collection container can collect for example the gas, in particular nitrogen, using which the electronic assemblies in the soft cooling module 22 are purged. Advantageously, the gas is cleaned before, after or inside the gas collection container 2 in order to then be fed back to the soft cooling module 22 via a supply line. The gas can thus be re-used. Furthermore, the soft cooling module 22 comprises a quick bleed valve 34. With the structure as described, a positive pressure, a negative pressure or a vacuum inside the soft cooling module 22 can be controlled.

Figure 4:
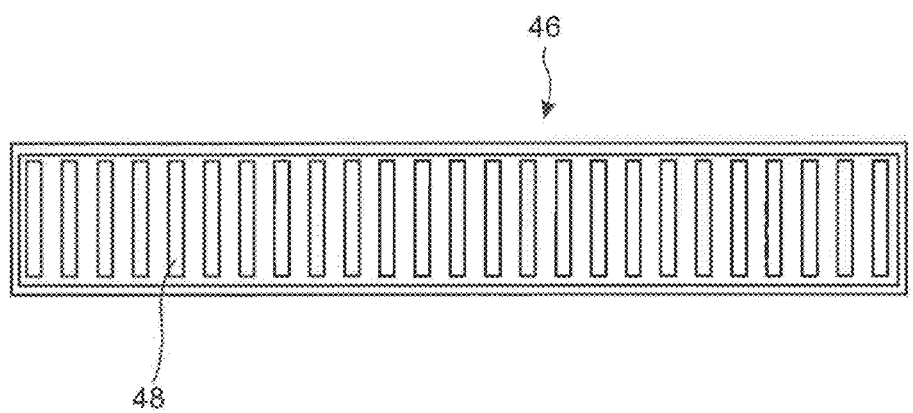
FIG. 4 an embodiment of a cold trap.

FIG. 4 shows an embodiment of a cold trap 46. The cold trap 46 can be arranged inside the process chamber of the soft cooling module 22. The cold trap 46 has in this embodiment fins 48 for enlarging a cooling surface and to permit condensate to run off. Furthermore, the cold trap 46 can have a drip tray (not shown) configured to collect the condensate. The cold trap 46 can also act as a gas cooler to protect the downstream valves and the downstream pump system.

Figure 5:
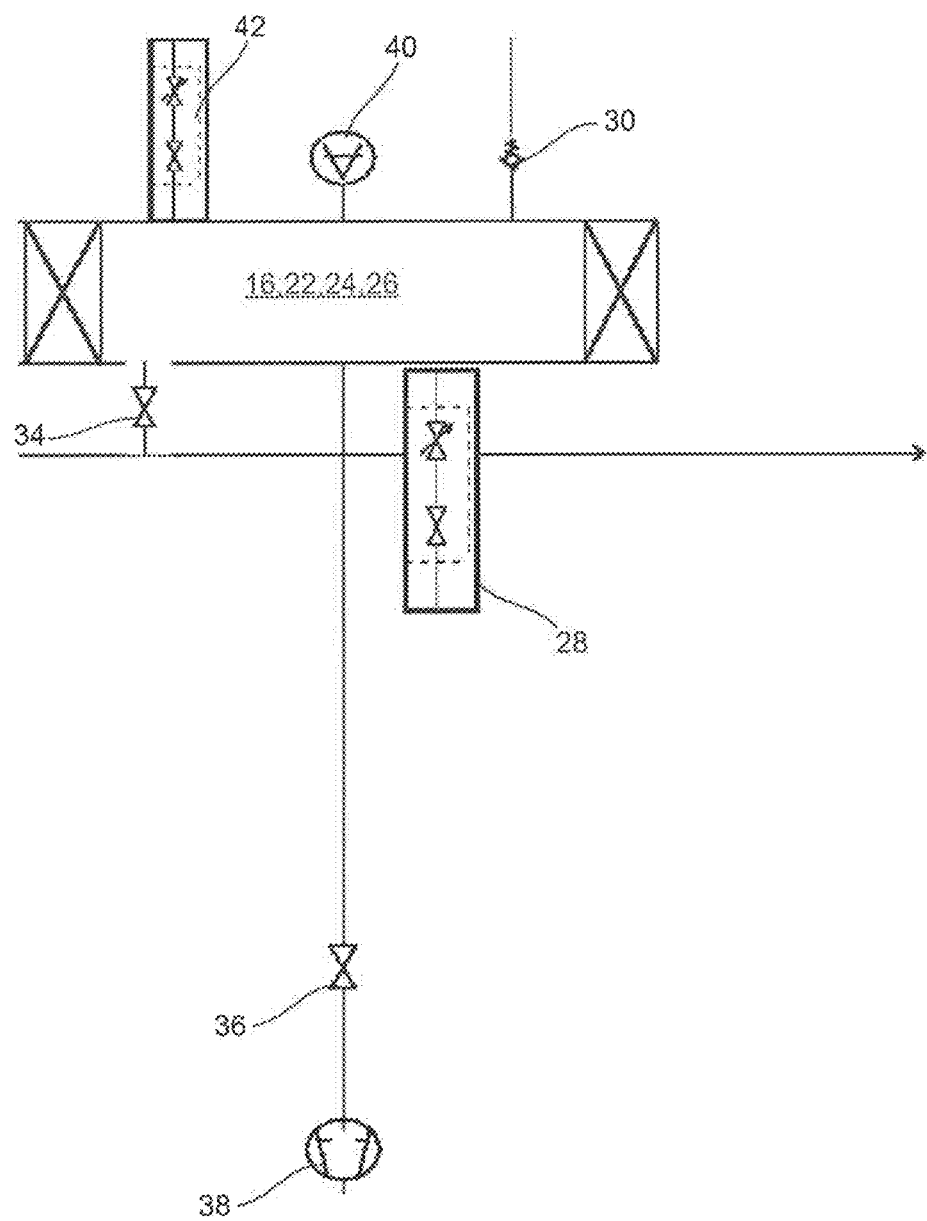
FIG. 5 a circuit diagram of a further embodiment of a system in accordance with the invention.

FIG. 5 shows a circuit diagram of a further embodiment of a system 10 in accordance with the invention. Unlike in the embodiment according to FIG. 3, a further pressure control valve 42 is arranged on the soft cooling module 22. This can, like the positive pressure relief valve 30, have a connection to the waste air.

In all the embodiments shown, a positive pressure can be generated in the soft cooling module 22, wherein the positive pressure can for example be less than 0.5 bar to avoid the need for certification in accordance with the pressure equipment directive. The soft cooling module 22 too can be designed in accordance with the pressure equipment directive and have a positive pressure of for example 3 bar or more. A controlled temperature adjustment to just below the solder solidification temperature can be made using a heating and/or cooling device in the soft cooling module 22. This allows impurities in the solder to be prevented, since they already remain behind in the soft cooling module 22 before complete cooling down to room temperature in the downstream cooling module 20 and so cannot collect on the electronic assemblies. Advantageously, therefore, a purging gas is used in the soft cooling module 22 with which the impurities are removed or purged directly out of the soft cooling module 22.

Figure 6:
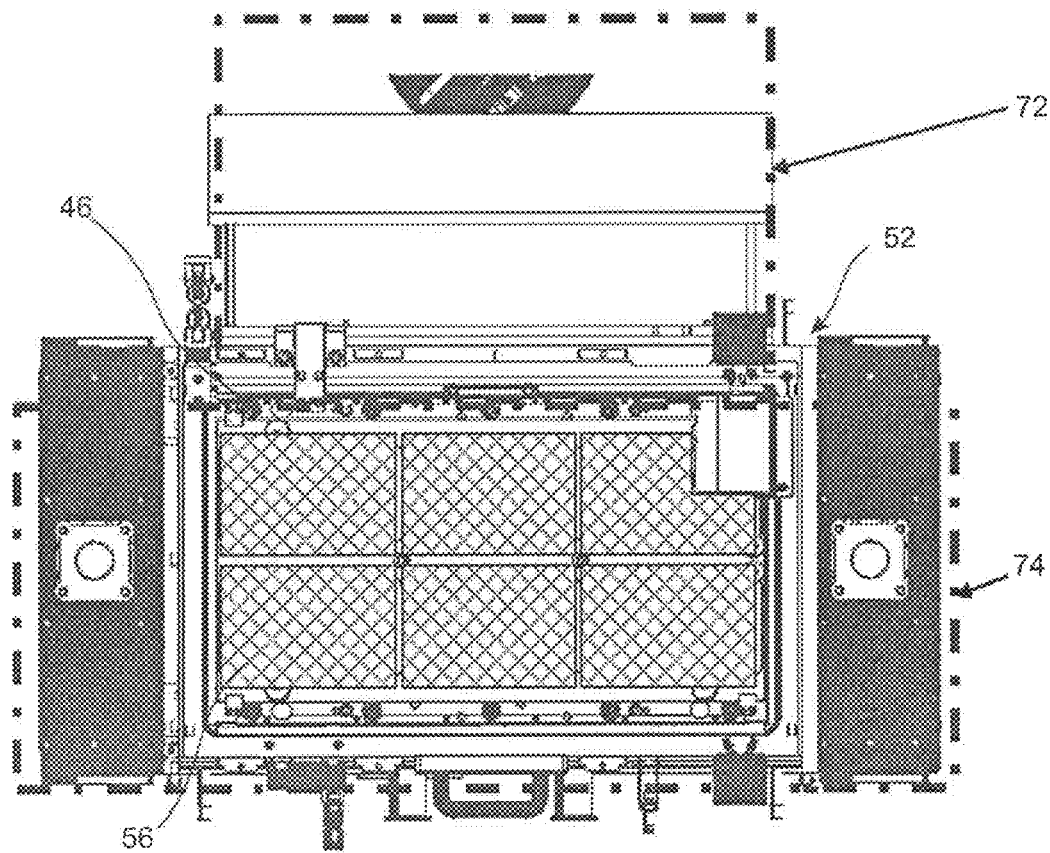
FIG. 6 a plan view onto a process chamber.

FIG. 6 shows a plan view onto a process chamber 52. The process chamber 52 is preferably designed as a gas-tightly sealable process chamber 52 and arranged inside a module 16 designed as a soldering module 18. In the process chamber 52, a plurality of electronic assemblies are arranged on a workpiece carrier 56. Furthermore, a heat source 50 (shown in FIG. 7) and a cold trap 46 are arranged in the process chamber 52. This allows a cold area 72 and a hot area 74 to be formed. The process chamber 52 is preferably a vacuum process chamber. With the heat source 50 and the cold trap 46, a specific process atmosphere can be provided in the process chamber 52. Due to the arrangement of the cold trap 46 and of the heat source 50 relative to one another, currents in the process atmosphere thus arise solely due to convection, which is generated by a temperature difference between the cold trap 46 and the heat source 50.

Figure 7:
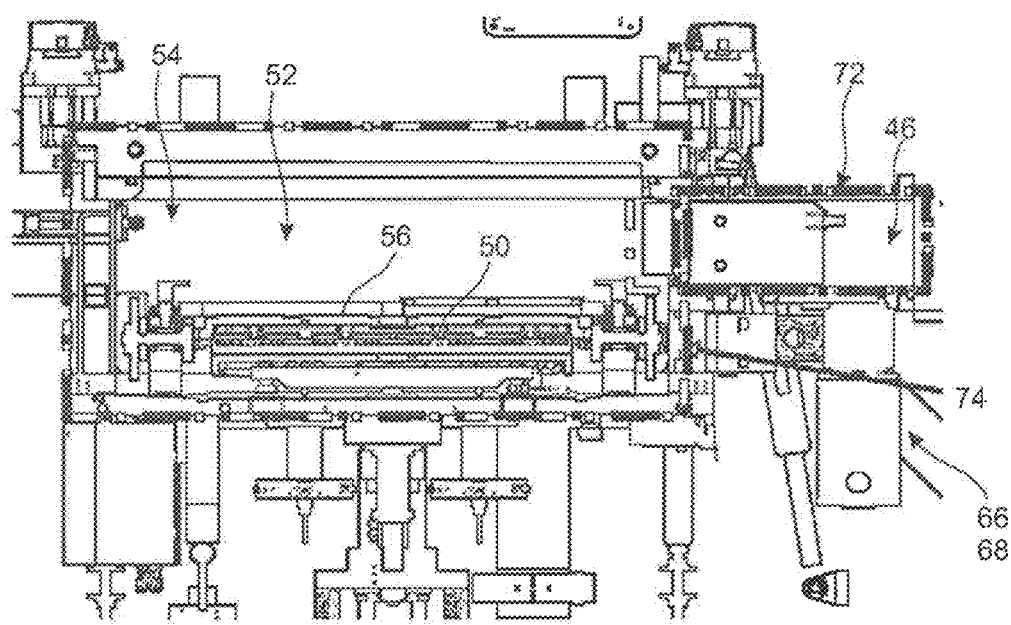
FIG. 7 a sectional view of the process chamber of FIG. 6.

FIG. 7 shows a sectional view of the process chamber 52 of FIG. 6. In this view the heat source 50 is shown on the underside of the process chamber 52. The heat source 50 is therefore preferably underneath the workpiece carrier 56. An additional heat source (not shown) can be arranged for additional heating of the process chamber 52. To achieve an optimum effect, it is advantageous for the cold area 72 to project as far as possible into the process chamber 52. Less fouling of the modules 16 results during the soldering process thanks to the cold trap 46. This is achieved in that the condensate from the solder paste is collected and deliberately passed out of the system. Preferably, a pressure of less than or equal to 950 bar prevails here in the process chamber 52. This can be achieved for example by N2, N2H2 or HCOOH or by gas mixtures. In particular, a quiescent gas without forced guidance is present. This results in evaporation of the organic constituents, with the hot gas rising upwards with the organic constituents in the process chamber 52. The temperature gradient between the hot and the cold surfaces leads however to convection of the gas inside the process chamber 52, in particular inside the vacuum process chamber. Volatile constituents therefore condense on the cold surfaces and are thus passed into the cold trap 46 and collected there. Further advantages result for example in that residues of the condensate evaporate on surfaces at approx. 100° C. and can finally be deliberately disposed of by evacuation of the vacuum process chamber, for example by an extraction vacuum pump 66 and/or a liquid separator 68.

Figure 8:
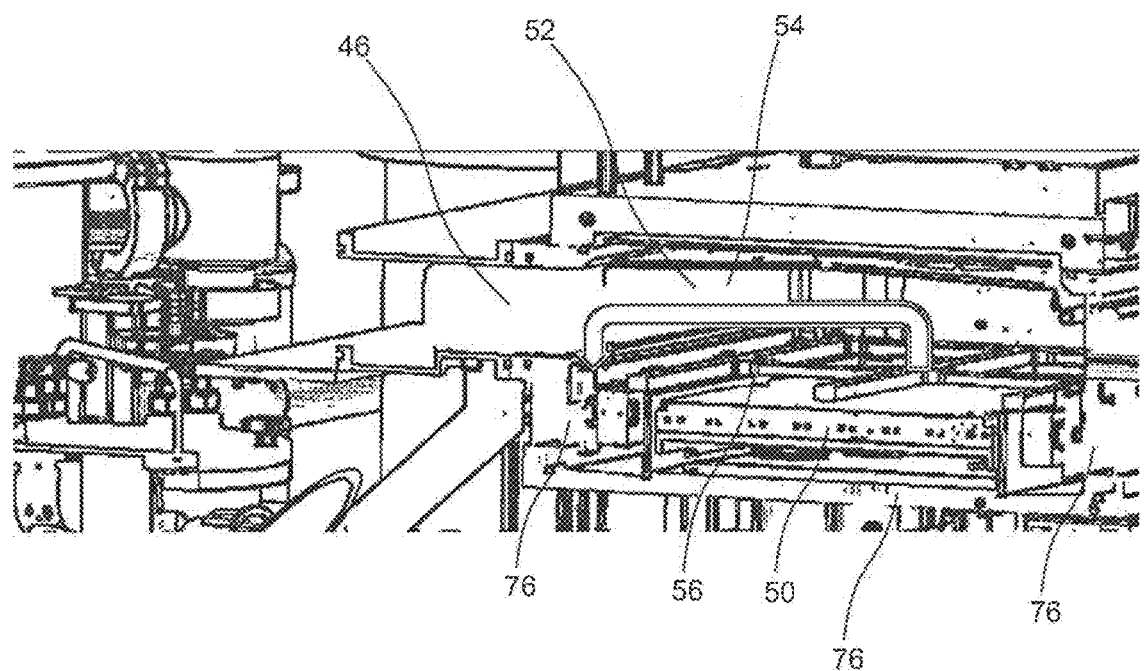
FIG. 8 a further view of the process chamber of FIG. 6.

FIG. 8 shows a further view of the process chamber 52 of FIG. 6. The surfaces on which the residues of the condensate evaporate are shown by the temperature adjustment zones 76. In an embodiment of this type, a deliberate use of the vapor pressure of solvents can be exploited in particular. Some solvents condense on the temperature adjustment zones 76, since the vapor pressure is higher than at 100° C. with a pressure of 950 bar. By the deliberate evacuation of the process chamber 52, in particular of the vacuum process chamber, the residues of the solvents evaporate and also condense on the cold surfaces, i.e. in the cold areas 72, of the cold trap 46 and are therefore deliberately collected. In the area of the cold trap 46, a temperature range of 2° C. to 30° C., preferably 16° C. to 25° C., can therefore prevail. In the temperature adjustment zone 76, the temperatures can be 100° C. In the area of the heat source 50 and on the upper side of the process chamber 52, the temperatures can be 150° C. to 300° C., for example due to an additional heat source 54.

Figure 9:
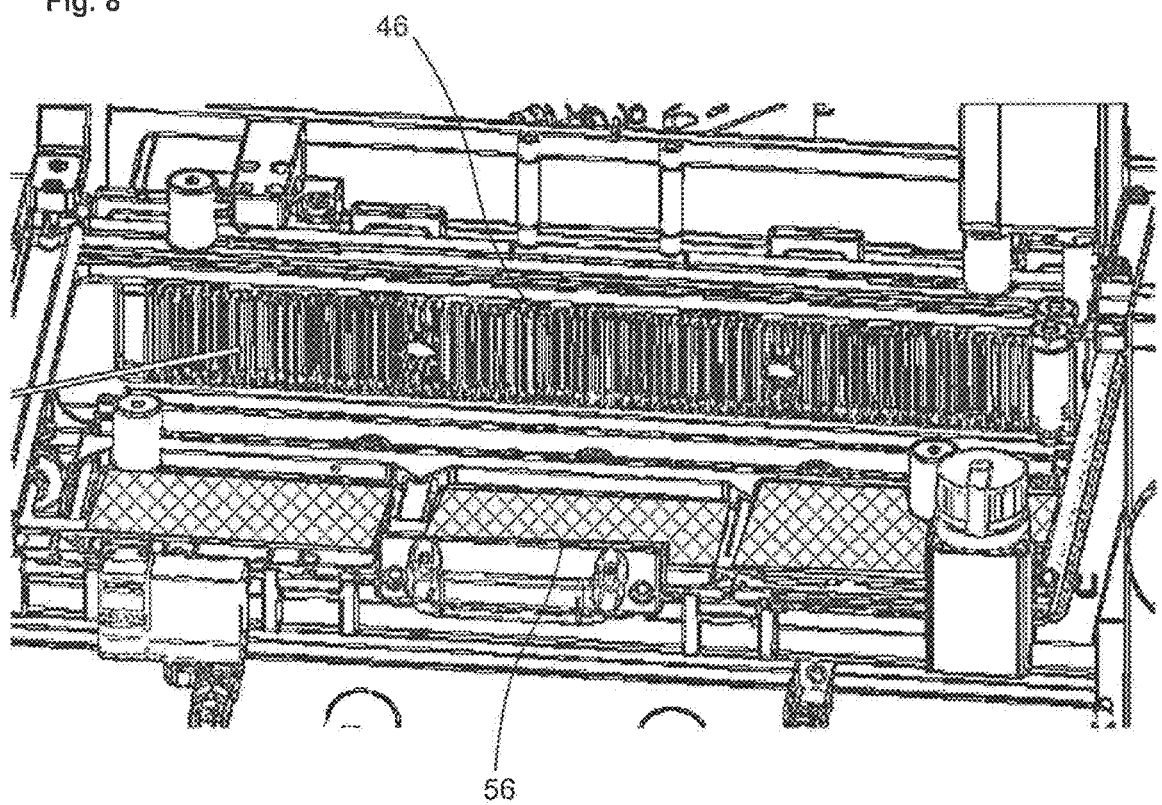
FIG. 9 a cold trap with cooling fins.

FIG. 9 shows a cold trap 46 with cooling fins 48. The cooling fins 48 can be arranged on the inner wall of the process chamber 52 and serve to enlarge the cooling surface. Furthermore, running off of the condensate can be improved by the cooling fins 48. The representation shows a view from the interior of the process chamber 52, with a workpiece carrier 56 being arranged on the floor of the process chamber 52.

Figure 10:
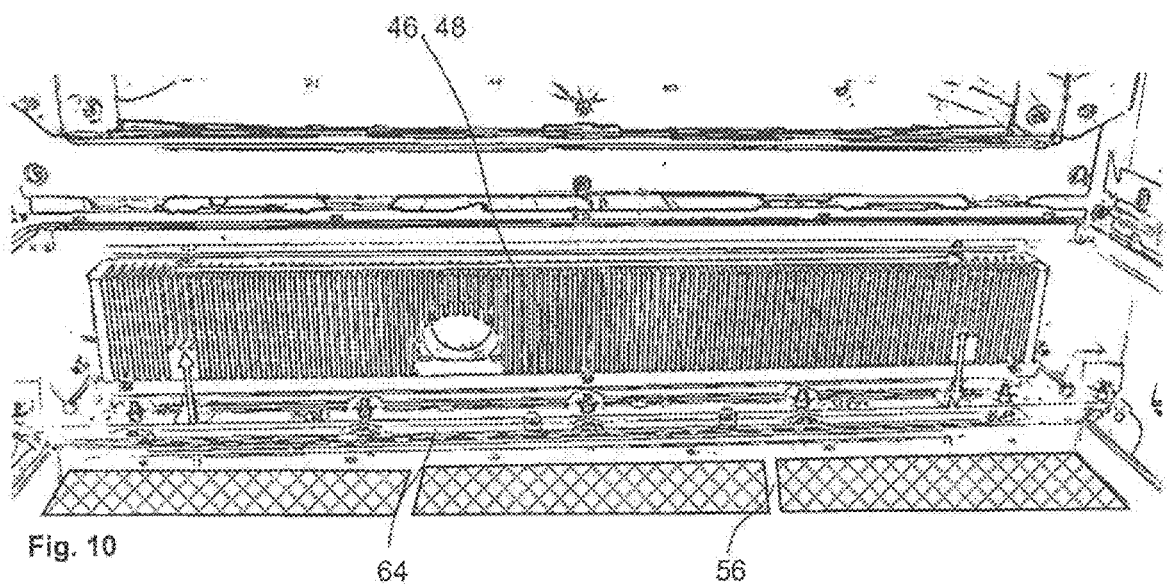
FIG. 10 a further embodiment of a cold trap with cooling fins.

FIG. 10 shows a further embodiment of a cold trap 46 with cooling fins 48. Underneath the cooling fins 48 a collection device 64 is discernible which is designed for collection of the condensate generated at the cold trap 46.

Figure 11:
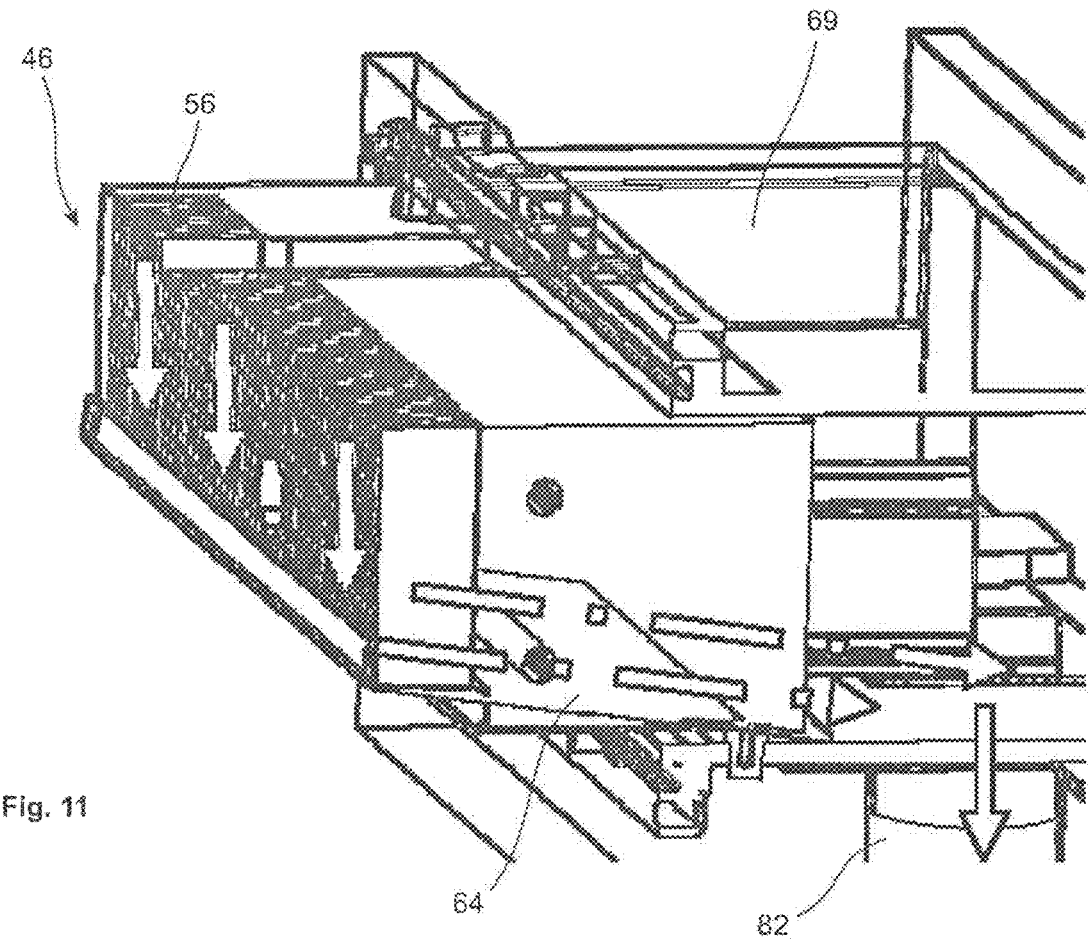
FIG. 11 a side view of a further cold trap.

FIG. 11 shows a side view of a further cold trap 46. The arrow directions show the running off direction or flow direction of the condensate. The condensate runs downwards inside the cooling fins 48 in the cold trap 46 and lands on the collection device 64. The collection device 64 can for example be designed as a drip tray. The collected condensate flows in the direction of a collection container 82 via the collection device 64. A continuous evacuation can be assisted by a vacuum pump line. The condensate contains in particular solvents, unwanted deposits and/or impurities.

Figure 12:
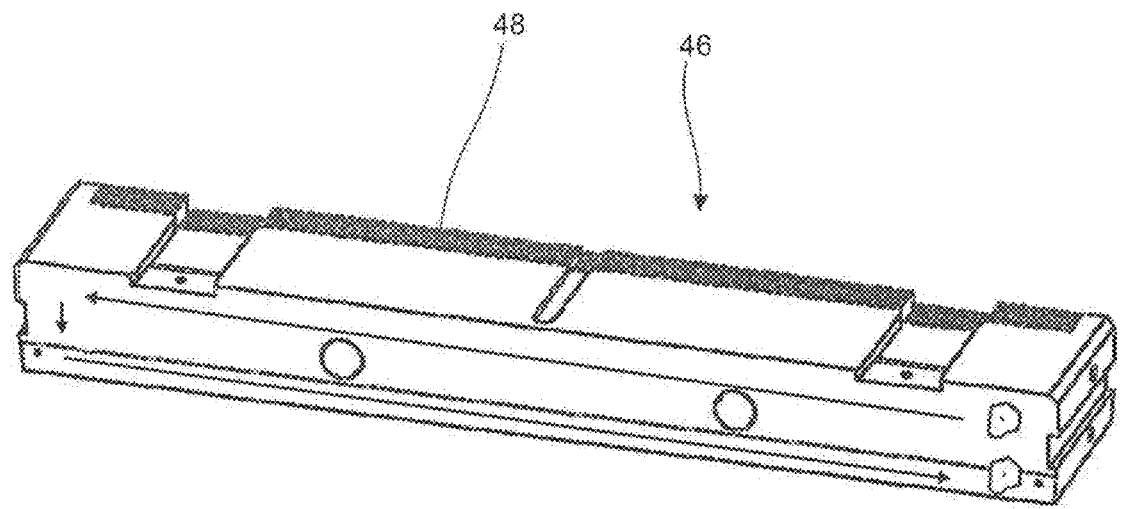
FIG. 12 a possible cooling circuit in a cold trap.
Figure 13:
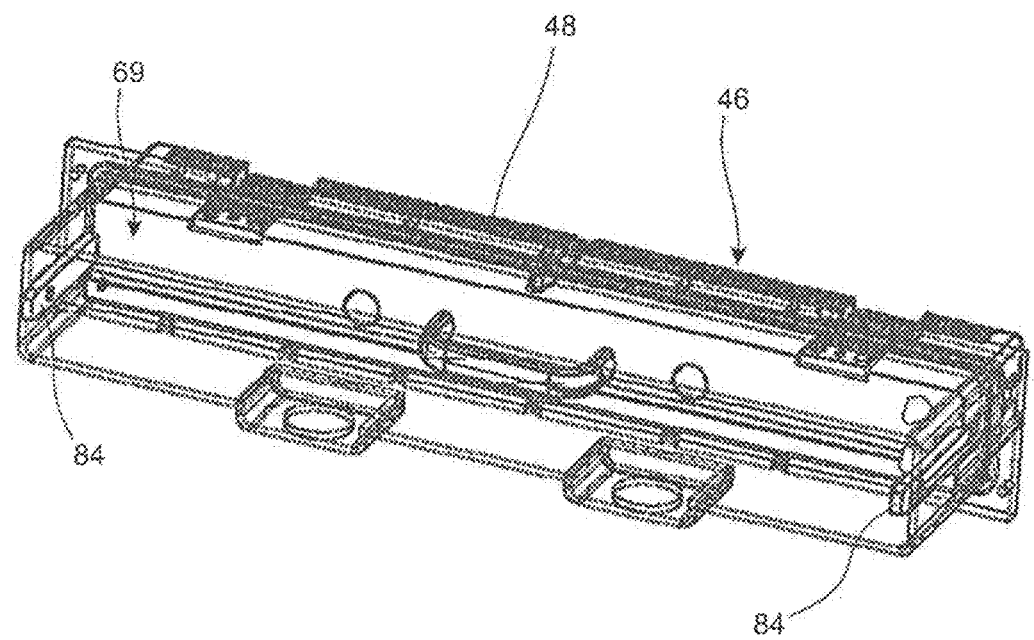
FIG. 13 a receiving element for the cold trap of FIG. 12.

FIG. 12 shows a possible cooling circuit of a cold trap 46, shown by the arrow direction. FIG. 13 shows a receiving element 69 for the cold trap 46 of FIG. 12. In an embodiment of this type, the cold trap 46 can therefore be mountable in exchangeable manner. The cold trap 46 is inserted from the rear into the receiving element 69, in particular over guides 84 arranged on two opposite sides of the receiving element 69. Thermal insulation is also arranged in particular on the guides 84. The receiving element 69 is mounted directly on the process chamber 52 (not shown). The receiving element 69 can also itself form the process chamber 52, wherein the cold trap 46 can be mounted directly on the process chamber 52.

Figure 14:
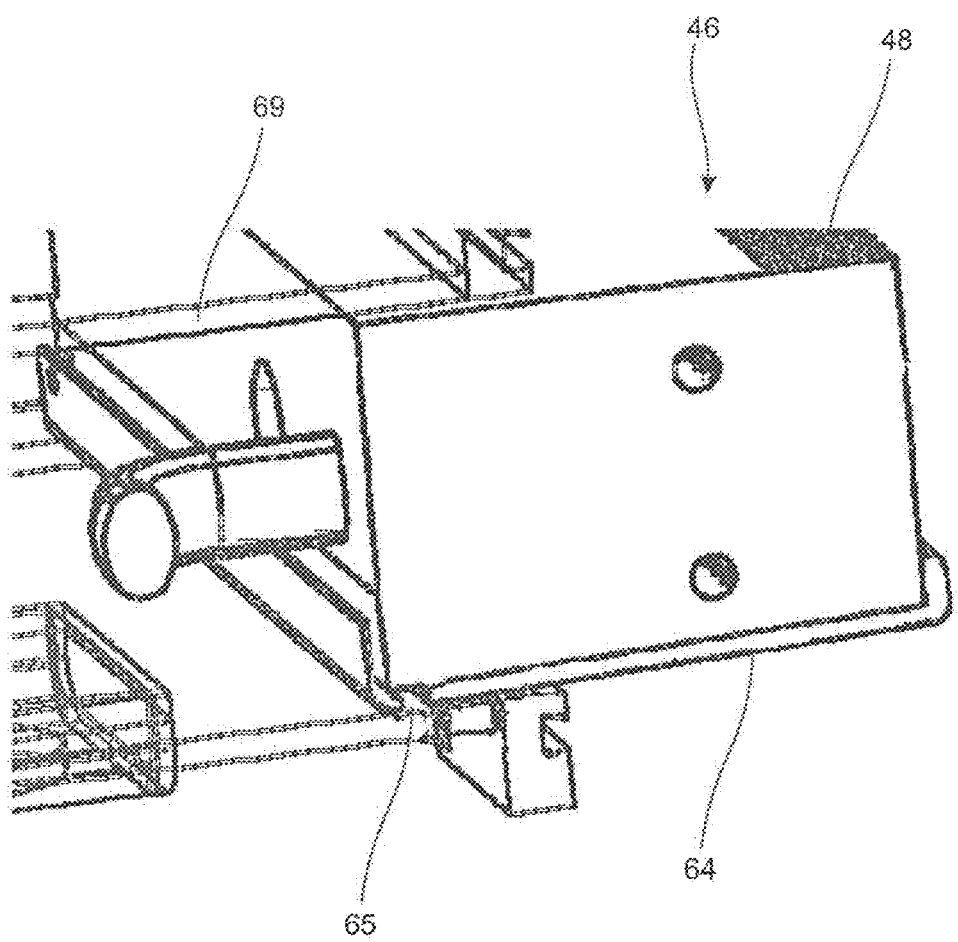
FIG. 14 a collection device of a cold trap.

FIG. 14 shows a collection device 64 of a cold trap 46. As in FIG. 11, in this representation the collection device 64 is designed as a drip tray, wherein the collected condensate is drained via an opening 65, in this embodiment designed as a slot, rearwards into the receiving element 69.

Figure 15:
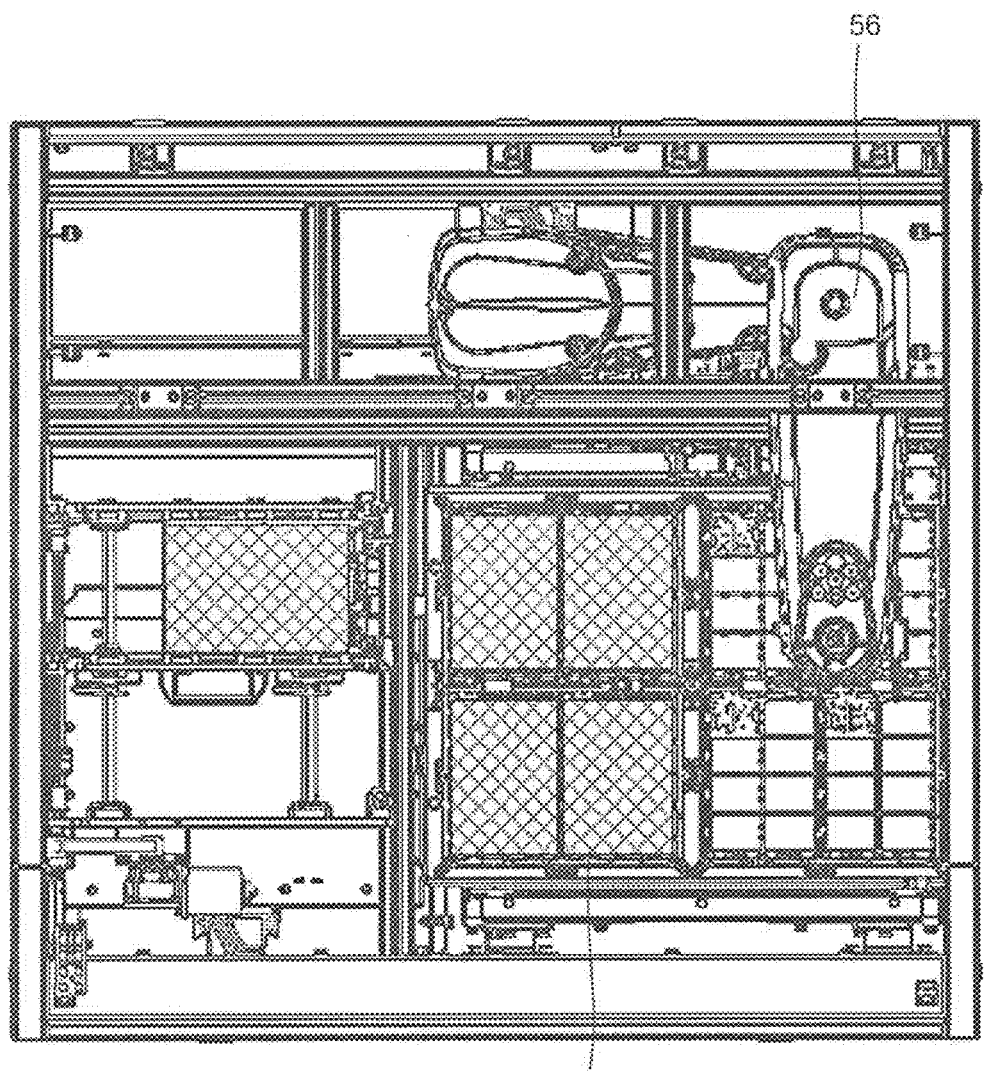
FIG. 15 a plan view onto a module of the soldering system with robot.

FIG. 15 shows a plan view onto a module 16 of the soldering system 10a with robot. The shown module 16 can represent in particular the module 16 shown right on the left-hand side in FIG. 1, and can in particular be designed as a loading station. In the loading station, in particular the workpiece carriers 56 are loaded with electronic assemblies 12, wherein this can be done using a robot arm 78 in this embodiment.

Figure 16:
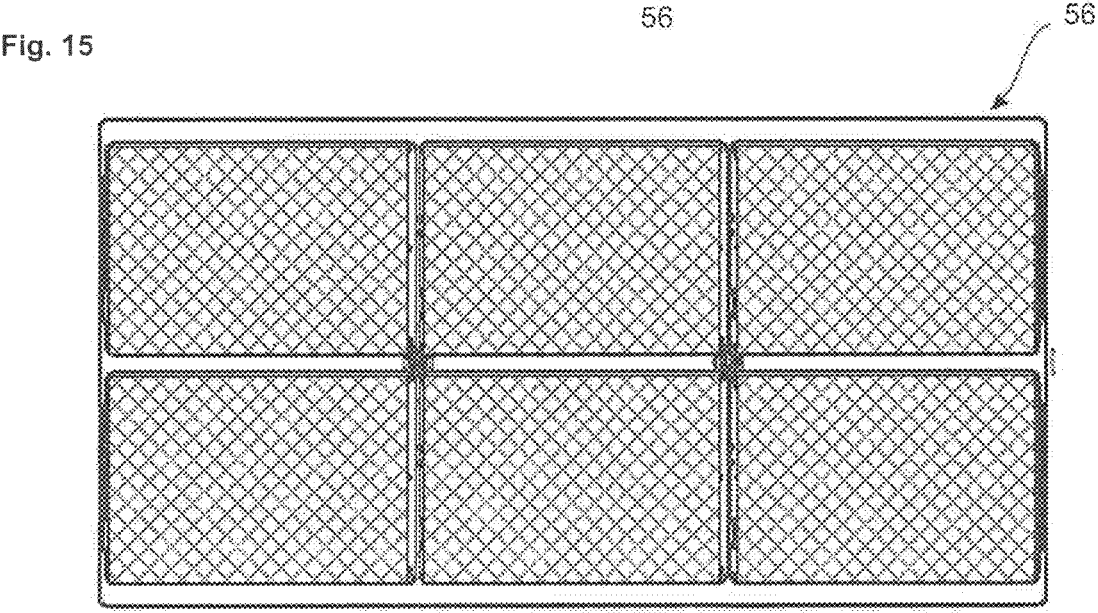
FIG. 16 an embodiment of a workpiece carrier.

FIG. 16 shows an embodiment of a workpiece carrier 56. This is designed for six electronic assemblies 12. A workpiece carrier 56 of this type is used in particular in a process chamber 52 as shown in FIGS. 6 to 9.

Figure 17:
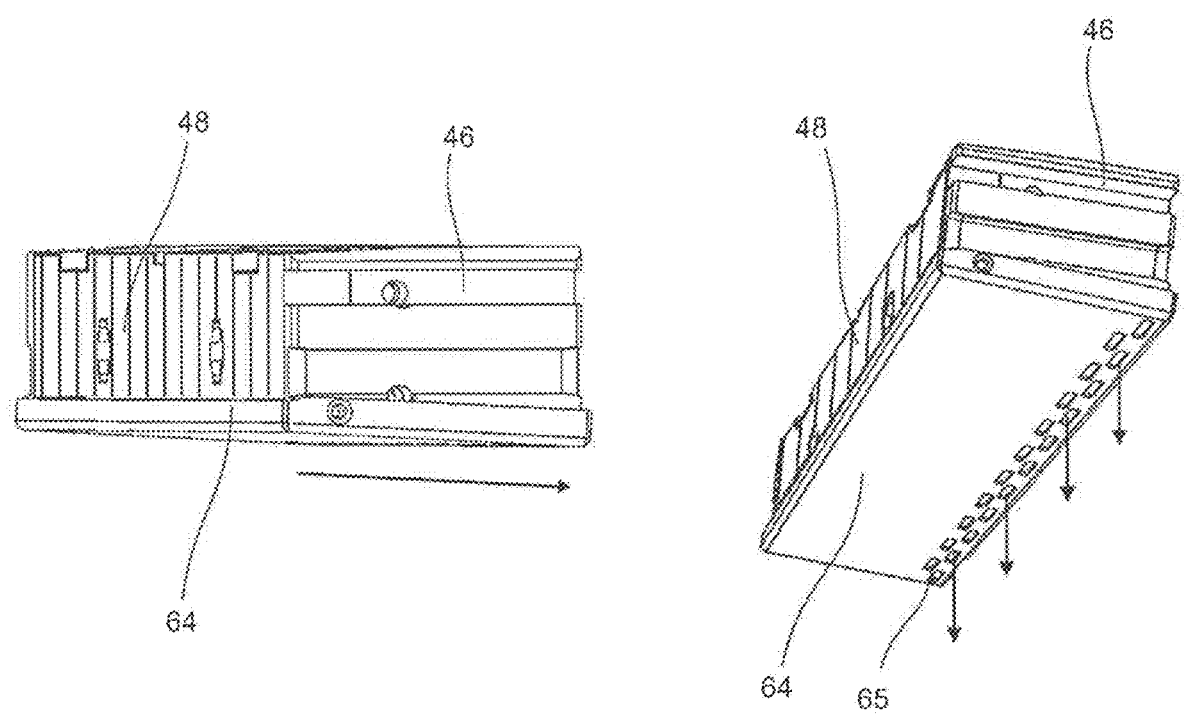
FIG. 17 a further embodiment of a cold trap.

FIG. 17 shows a further embodiment of a cold trap 46. In this embodiment too, the cold trap 46 has a collection device 64 extending as an inclined plane on the underside of the cold trap 46. In contrast to the representation according to FIG. 14, the collection device 64 has no slot, but individual openings 65 out of which the condensate is drained from the cold trap 46 and into the receiving element 69 (not shown).

Figure 18:
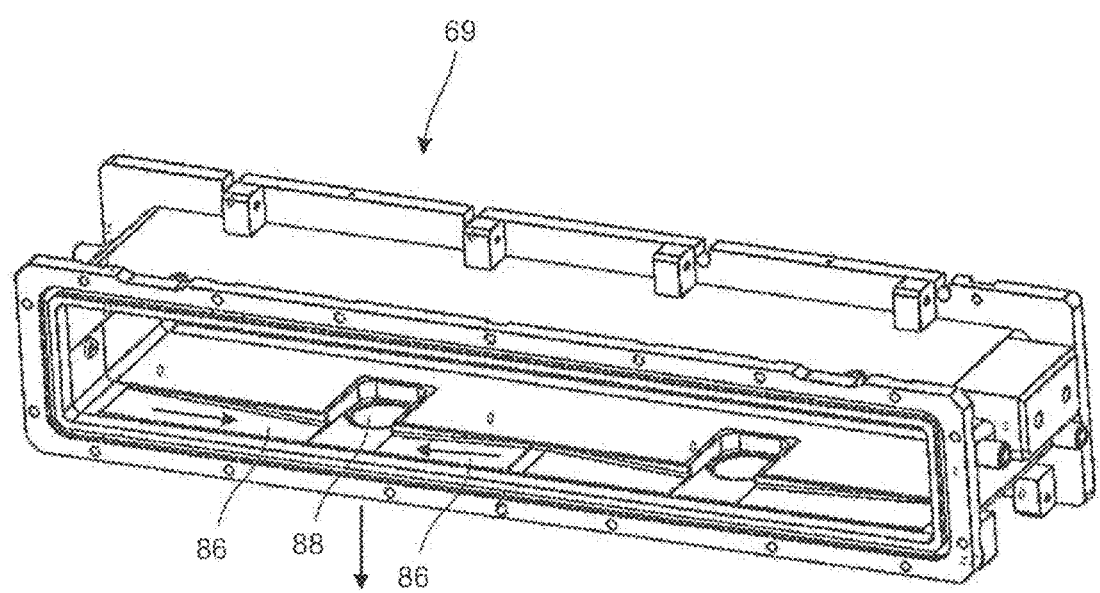
FIG. 18 an embodiment of a receiving element for the cold trap of FIG. 17.

FIG. 18 shows an embodiment of a receiving element 69 for the cold trap 46 of FIG. 17. On the underside of the receiving element 69, a plurality of inclined surfaces 86 are arranged via which the condensate can be passed out of the openings 65 of the cold trap 46. The condensate runs over the inclined surfaces 86 to an opening 88 and is drained via the opening 88 out of the receiving element 69. In the embodiment shown, the receiving element 69 has two openings 88 of this type, to each of which two inclined surfaces 86 lead. The receiving element 69 forms in other words a kind of receiving box for the cold trap.

Figure 19:
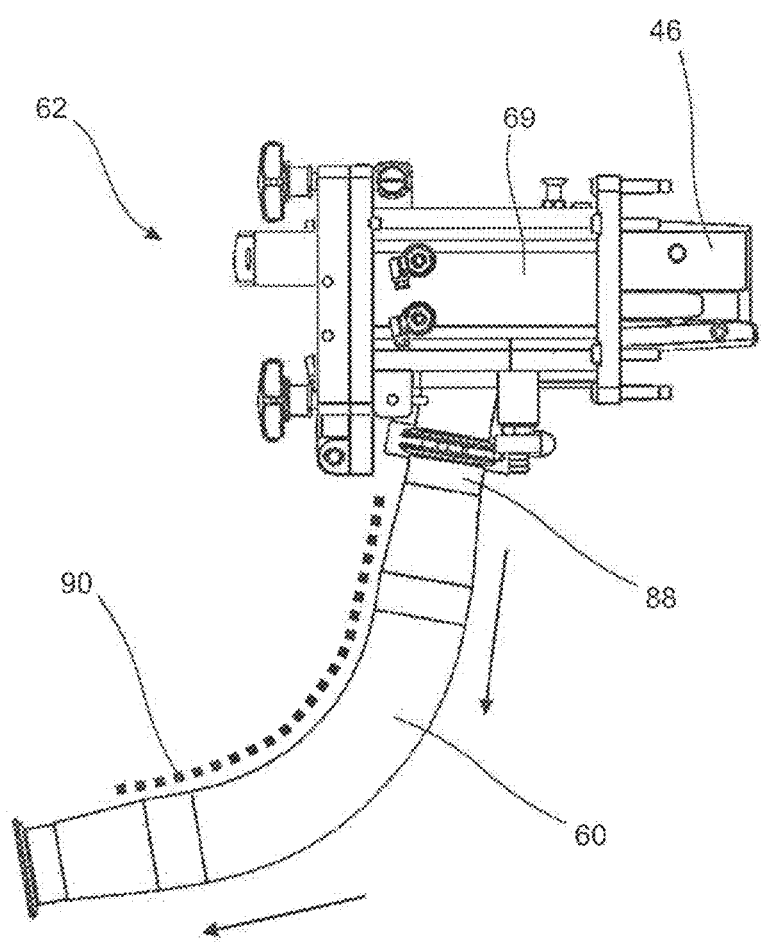
FIG. 19 a side view of the receiving element with cold trap of FIGS. 17 and 18.

FIG. 19 shows a side view of the receiving element 69 with cold trap 46 of FIGS. 17 and 18. It can be seen that a pipeline 60 which deliberately drains the condensate is connected to the opening 88. In other words, the process chamber 52 is connected via the pipeline 60. An outlet of the pipeline 60 connected to the opening 88 is provided immediately adjacent to the cold trap 46. A heating sleeve 90 can be arranged around the pipeline 60.

A structure of this type with a receiving element 69 can also be referred to as an evacuation device 62. The evacuation device 62 can of course be designed differently to that shown in FIG. 19.

Figure 20:
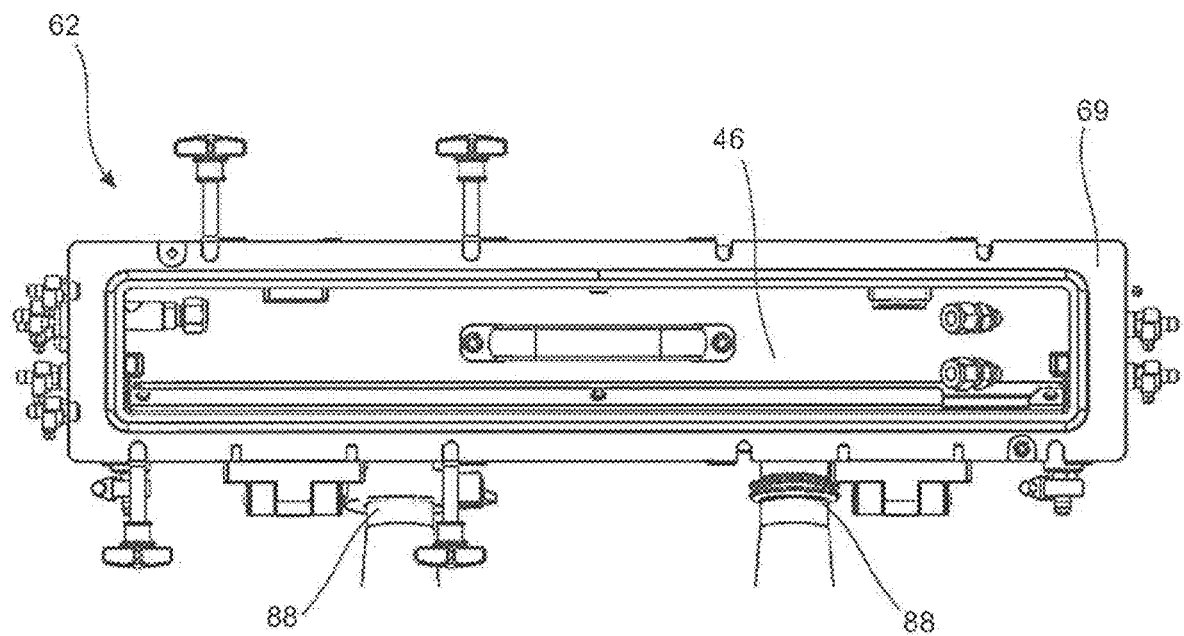
FIG. 20 a further view of the embodiment of FIG. 19.

FIG. 20 shows a further view of the embodiment of FIG. 19. It can be seen that the receiving element 69 has two openings 88 on the underside which are each connected via a pipeline 60.

Figure 21:
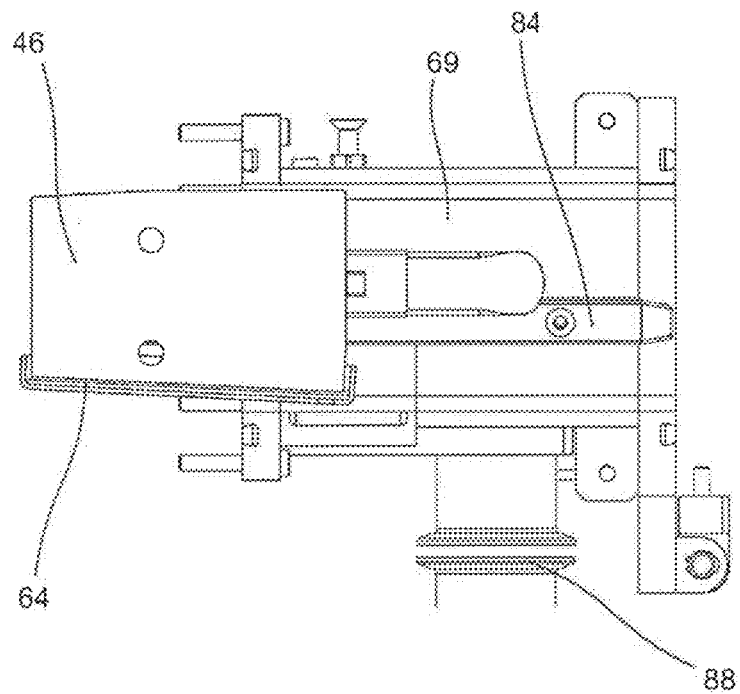
FIG. 21 a sectional view of the embodiment of FIG. 19.

FIG. 21 shows a sectional view of the embodiment of FIG. 19. In this embodiment it can be seen how the cold trap 46 with the collection device 64, in particular in the form of a drip tray, is inserted from one side into the receiving element 69. The cold trap 46 can be held in guided manner in the receiving element 69 by guides 84.

Figure 22:
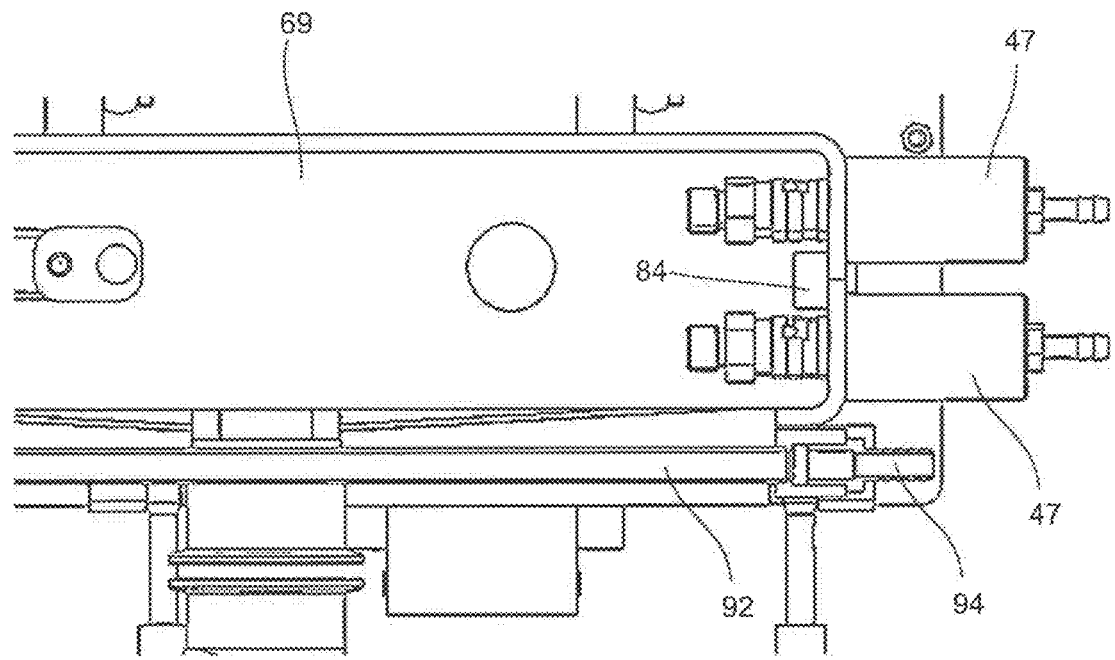
FIG. 22 a detailed view of the embodiment of FIG. 20.

FIG. 22 shows a detailed view of the embodiment of FIG. 20. Two connections 47 for the cold trap 46 are provided on the right-hand side. A heating element 92, whose connection 94 is likewise on the right-hand side of the receiving element 69, is arranged on the underside of the receiving element 69. This heating element 92 can for example form an additional heat source 54.

Figure 23:
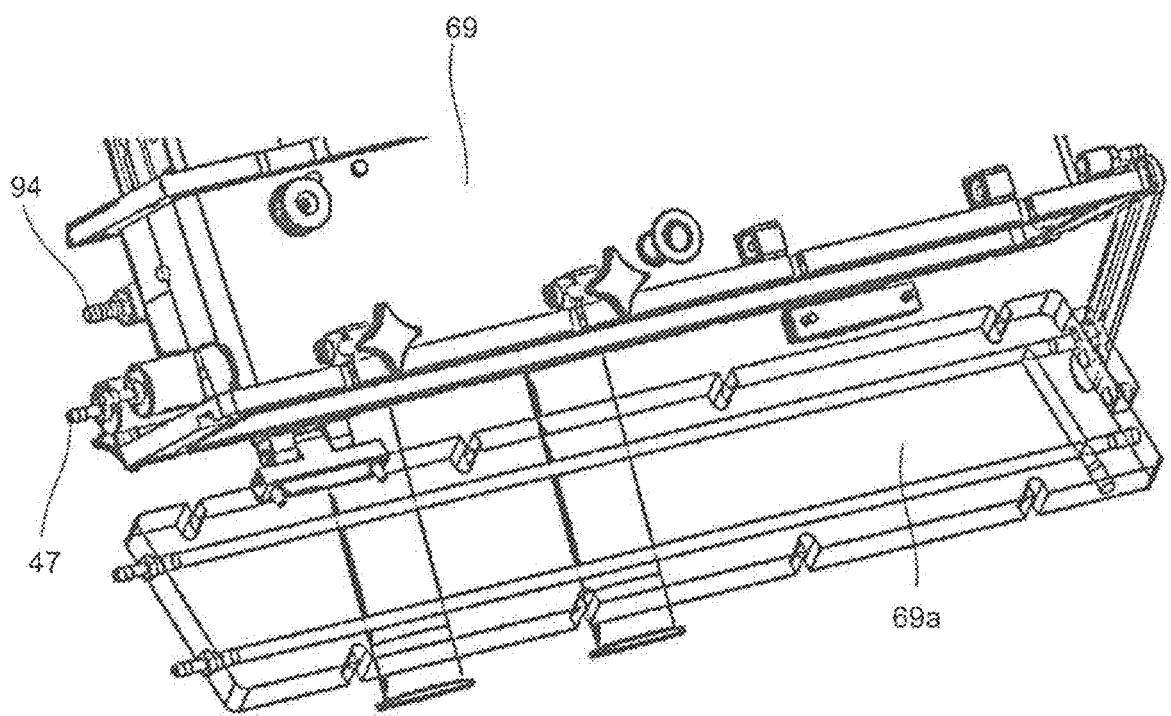
FIG. 23 an isometric representation of the receiving element with opening element.

FIG. 23 shows an isometric representation of the receiving element 69 with opening element 69a. The opening element 69a is swivelably mounted on the receiving element 69.

Figure 24:
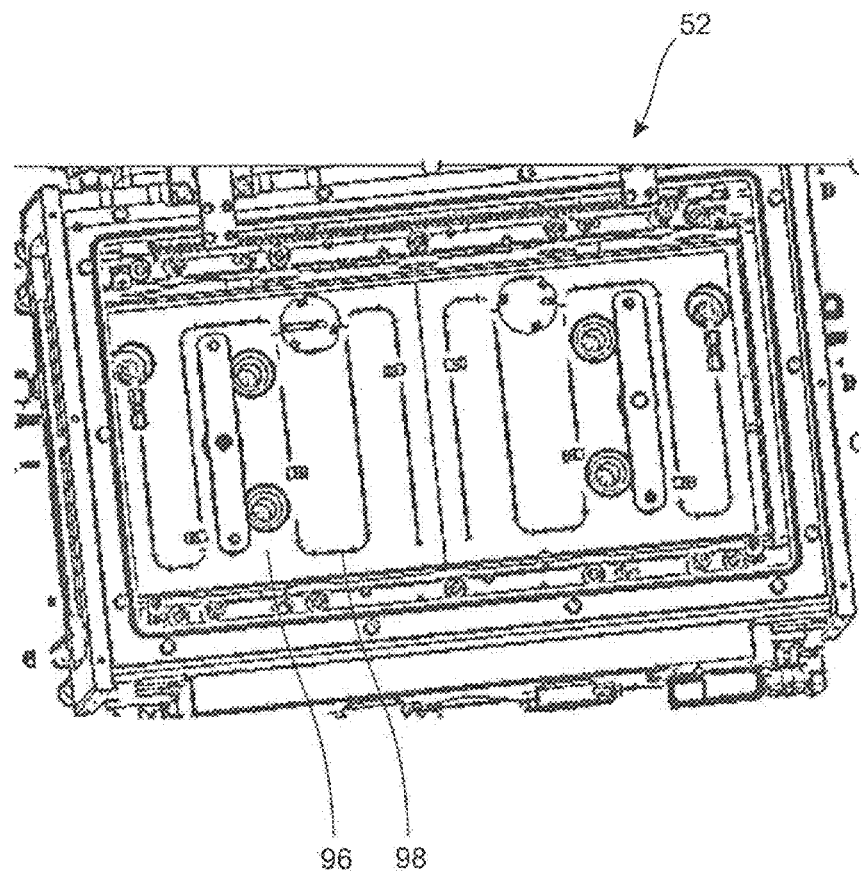
FIG. 24 a sectional representation through a process chamber.

FIG. 24 shows a sectional representation through a process chamber 52. A heating plate 96 provided with a heating conductor 98 is provided on the underside of the process chamber 52. To close the process chamber 52, it can have a swiveling cover (not shown) that can be bolted to the process chamber 52. This allows the process chamber 52 to be designed gas-tight.

Figure 25:
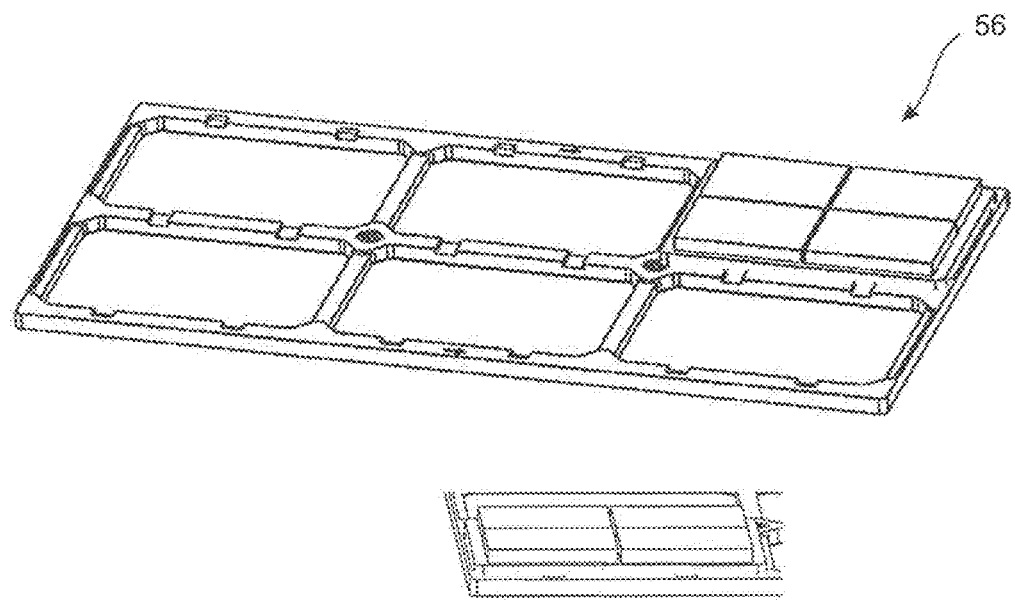
FIG. 25 a further embodiment of a workpiece carrier.
Figure 26:
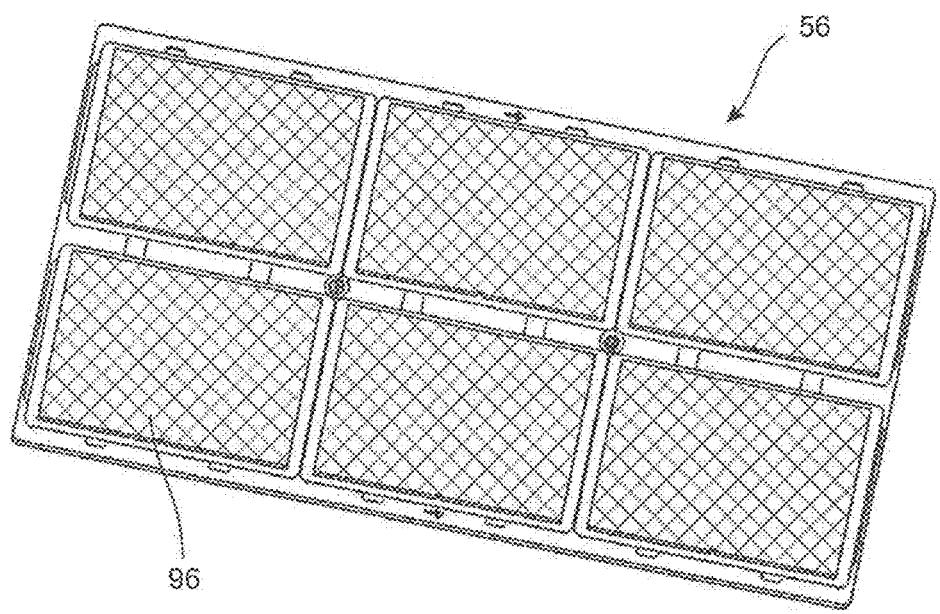
FIG. 26 a further view of the embodiment of FIG. 25.

FIG. 25 shows a further embodiment of a workpiece carrier 56. FIG. 26 shows a further view of the embodiment of FIG. 25. The heating plate 96 is discernible directly underneath the receiving elements for the electronic assemblies 12 (not shown). The heating plate 96 can be designed as a contact plate with a sandwich structure. A cooling operation can be performed using thermal oil and/or a heating cable. A sandwich plate of this type can form a controllable and heatable contact plate and also be referred to as a soft cooling plate. For soft cooling, heating conductors 98 inserted in meandering form are comprised in the heating plate 92. Furthermore, a thermocouple, in particular a substrate thermocouple, can be comprised, which is for example arranged in the center and/or flexibly designed.

LIST OF REFERENCE SIGNS

10 System
10a Soldering system
12 Electronic assemblies
14 Preheating module
16 Module
18 Soldering or sintering module
20 Cooling module
22 Soft cooling module
24 Positive pressure chamber
26 Vacuum chamber
28 Inlet valve
30 Positive pressure valve 32 Gas collection container
34 Quick bleed valve
36 Evacuation valve
38 Backing pump
40 Pressure monitoring chamber
42 Pressure control valve
44 Vacuum insertable gate valve
46 Cold trap
47 Connection of cold trap
48 Fins/cooling fins
50 Heat source
52 Process chamber
54 Additional heat source
56 Workpiece carrier
58 Transport device
60 Pipeline
62 Evacuation device
64 Collection device
65 Opening
66 Extraction vacuum pump
68 Liquid separator
69 Receiving element
69a Opening element for receiving element
72 Cold area
74 Hot area
76 Temperature adjustment zone
78 Robot arm
80 Cooling element
82 Collection container
84 Guides
86 Inclined surface
88 Opening
90 Heating sleeve
92 Heating element for receiving element
94 Connection for heating element
96 Heating plate
98 Heating conductor

The invention claimed is:

1. A soldering or sintering system for connecting electronic assemblies, comprising:
a transport device for conveying the electronic assemblies through the system, comprising;
a plurality of gas-tightly separable modules for connecting the electronic assemblies to one another, wherein at least one of the plurality of modules is designed as a soldering or sintering module and one of the plurality of modules is designed as a cooling module;
vacuum insertable gate valves by which a separation of the gas-tightly separable modules is achieved, wherein a tightness of the vacuum insertable gate valves increases as the pressure increases and/or pressure equalization using the vacuum insertable gate valves takes place when the pressure is too high;
a control for controlling the plurality of modules;
between the at least one soldering or sintering module and the cooling module, a further module arranged that is designed as a mid-temperature-control module for controlled cooling from a process temperature of the at least one soldering or sintering module to an intermediate temperature below a solder solidification temperature, the mid-temperature-control module comprising a vacuum pump and a bleed valve configured to provide a positive pressure for a process atmosphere of 1 bar to 4.5 bar and a negative pressure of below 1 bar to vacuum;
wherein in the mid-temperature-control module, a heating and a cooling device are comprised for controlled temperature adjustment and cooling down of the electronic assemblies from the process temperature of around 500° C. to the intermediate temperature below the solder solidification temperature, which is in the range from 220° C. to 150° C.;
wherein in the mid-temperature-control module, a gas purging device for purging the electronic assemblies by cold gas comprising formic acid or nitrogen is comprised.

2. The soldering or sintering system according to claim 1, wherein the mid-temperature control module is designed as a positive pressure chamber and/or vacuum chamber.

3. The soldering or sintering system according to claim 1, wherein the heating and/or a cooling device is designed as a heatable and/or coolable contact plate.

4. The soldering or sintering system according to claim 3, wherein:
the contact plate is designed as a heating plate; and
the cooling device is designed as a gas cooling device for cooling down the contact plate by means of a gas flow from a side of the heating plate facing away from the electronic assemblies.

5. The soldering or sintering system according to claim 3, wherein:
the contact plate is mechanically movable and can be brought into contact with and kept at a distance from the electronic assemblies; and/or
the contact plate comprises a gas rack.

6. The soldering or sintering system according to claim 1, wherein an inlet valve for admitting the gas into a process chamber of the mid-temperature control module is comprised on the mid-temperature control module.

7. The soldering or sintering system according to claim 1, further comprising a gas collection container outside a process chamber of the mid-temperature control module, which is connected to the inlet valve and is designed to receive the gas extracted from the process chamber of the mid-temperature control module.

8. The soldering or sintering system according to claim 1, wherein a positive pressure valve for checking a positive pressure and/or a quick bleed valve is comprised on the mid-temperature control module.

9. The soldering or sintering system according to claim 1, wherein a positive pressure of 4 to 6 bar prevails in the mid-temperature control module.

10. The soldering or sintering system according to claim 1, wherein the cooling down from a temperature below the solder solidification temperature to room temperature takes place in the cooling module.

11. The soldering or sintering system according to claim 1, wherein a normal pressure or negative pressure prevails in the cooling module.

12. The soldering or sintering system according to claim 1, further comprising a further module connected in front of the soldering or sintering module, that is designed as a preheating module.

13. The soldering or sintering system according to claim 1, further comprising a cold trap in a process chamber of the mid-temperature-control module.

14. The soldering or sintering system according to claim 1, wherein in the soldering or sintering module, or in the mid-temperature control module in a gas-tightly sealable process chamber at least one heat source contactable with the electronic assemblies for heating the electronic assemblies and at least one cold trap are arranged, the at least one cold trap having in operation a surface temperature which is lower than an operating temperature of the heat source.

15. The soldering or sintering system according to claim 14, wherein a specific process atmosphere is provided in the gas-tightly sealable process chamber, wherein the cold trap and the heat source are arranged relative to one another such that at least during a specific operating phase currents are present in the process atmosphere solely due to convection, which is generated by a temperature difference between the cold trap and the heat source.

16. The soldering or sintering system according to claim 14, wherein the surface temperature of the cold trap is between −196° C. (77 k) and 150° C.

17. The soldering or sintering system according to claim 14, further comprising at least one additional heat source for heating the gas-tightly sealable process chamber.

18. The soldering or sintering system according to claim 17, wherein the operating temperature of the heat source and/or of the additional heat source is between 150° C. and 400° C. or between 200° C. and 300° C.

19. The soldering or sintering system according to claim 14, wherein at least one assembly is arranged on a workpiece carrier and at a distance therefrom in a direction of the cold trap at least at times, such that the distance of the assemblies to the cold trap is less than a distance of the workpiece carrier to the cold trap.

20. The soldering or sintering system according to claim 14, wherein at least one partial area of the gas-tightly sealable process chamber is designed as a temperature adjustment zone, wherein said temperature adjustment zone has during operation a temperature between the surface temperature of the cold trap and the operating temperature of the heat source, wherein the temperature of the temperature adjustment zone is between 50° C. and 150° C.

21. The soldering or sintering system according to claim 14, wherein the gas-tightly sealable process chamber is connected or connectable via a pipeline to an evacuation device, wherein an outlet of the pipeline into the process chamber is provided immediately adjacent to the cold trap.

22. The soldering or sintering system according to claim 14, wherein the cold trap has a plurality of cooling fins.

23. The soldering or sintering system according to claim 14, further comprising a collection device provided underneath the cold trap to collect condensate generated at the cold trap.

24. The soldering or sintering system according to claim 19, wherein the heat source and/or the workpiece carrier with the assemblies are adjustable in their distances relative to the cold trap.

25. The soldering or sintering system according to claim 19, wherein the workpiece carrier is separately heatable.

26. The soldering or sintering system according to claim 14, further comprising a speed-controlled extraction vacuum pump with a liquid separator provided for creating a negative pressure in the gas-tightly sealable process chamber.

27. The soldering or sintering system according to claim 14, further comprising at least one heatable vacuum insertable gate valve provided for insertion and/or removal of the assemblies.

* * * * *